(12) United States Patent
Agrawal et al.

(10) Patent No.: US 10,749,677 B2
(45) Date of Patent: Aug. 18, 2020

(54) METHOD AND APPARATUS FOR ACCESS CONTROL IN DISTRIBUTED BLOCKCHAIN-BASED INTERNET OF THINGS (IOT) NETWORK

(71) Applicant: Samsung Electronics Co., Ltd., Suwon-si, Gyeonggi-do (KR)

(72) Inventors: Rahul Agrawal, Jaipur (IN); Pratik Verma, Meerut (IN); Suman Shekhar, Sitamarhi (IN); Aloknath De, Bangalore (IN); Sai Anirudh Kondaveeti, Hyderabad (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 15/956,027

(22) Filed: Apr. 18, 2018

(65) Prior Publication Data
US 2018/0302222 A1 Oct. 18, 2018

(30) Foreign Application Priority Data

Apr. 18, 2017 (IN) .............................. 201741013738
Dec. 21, 2017 (IN) .............................. 201741013738

(51) Int. Cl.
*H04L 29/06* (2006.01)
*H04L 9/32* (2006.01)
(Continued)

(52) U.S. Cl.
CPC .......... *H04L 9/3213* (2013.01); *G06F 21/604* (2013.01); *G06F 21/6218* (2013.01);
(Continued)

(58) Field of Classification Search
CPC ... H04L 9/3213; H04L 9/0637; H04L 9/3239; H04L 63/102; H04L 63/107; H04L 2209/38
See application file for complete search history.

(56) References Cited

U.S. PATENT DOCUMENTS 9,792,782 B1 * 10/2017 Basu ...................... G07F 19/203
9,858,781 B1 * 1/2018 Campero .............. G06F 17/142
(Continued)

FOREIGN PATENT DOCUMENTS

WO 2017053048 A1 3/2017

OTHER PUBLICATIONS

Blockstack Releases Blockchain-Powered, Tokenized Internet Browser, http://www.coindesk.com/blockstack-blockchain-decentralized-browser/, Apr. 18, 2018.
(Continued)

*Primary Examiner* — Sarah Su
(74) *Attorney, Agent, or Firm* — Jefferson IP Law, LLP

(57) ABSTRACT

An electronic device is provided. The electronic device includes a memory, a communication circuitry, and a processor configured to transmit, a first signal for requesting to access an external device, to the external device, receive, a second signal for requesting to provide a token stored in the electronic device, from the external device, the token being generated based on at least part of a block chain including at least one block that is respectively associated with at least one external device that has been accessed by the electronic device, in response to the reception, transmit, information on the token, to the external device, receive, a third signal indicating allowed the access, from the external device, the third signal being transmitted from the external device in response to identifying, by the external device, to validate
(Continued)

the token in all of the plurality of external devices, and access the external device based on the third signal.

18 Claims, 25 Drawing Sheets

(51) Int. Cl.
  *G06F 21/60* (2013.01)
  *H04L 9/06* (2006.01)
  *G06F 21/62* (2013.01)
(52) U.S. Cl.
  CPC .......... *H04L 9/0637* (2013.01); *H04L 9/3239* (2013.01); *H04L 63/102* (2013.01); *H04L 63/107* (2013.01); *H04L 2209/38* (2013.01)

(56) References Cited

U.S. PATENT DOCUMENTS

| | | | | |
|---|---|---|---|---|
| 9,967,332 | B1* | 5/2018 | D'Souza | H04L 67/104 |
| 10,225,258 | B2* | 3/2019 | Camenisch | H04L 63/102 |
| 10,243,868 | B1* | 3/2019 | Tsror | G06F 15/17331 |
| 10,356,053 | B1* | 7/2019 | Zubovsky | H04L 63/0876 |
| 2007/0198436 | A1* | 8/2007 | Weiss | G06Q 20/401 705/75 |
| 2011/0225305 | A1* | 9/2011 | Vedantham | G06F 1/3203 709/227 |
| 2015/0236908 | A1 | 8/2015 | Kim et al. | |
| 2016/0088477 | A1 | 3/2016 | Mahkonen et al. | |
| 2016/0112433 | A1 | 4/2016 | Chung et al. | |
| 2016/0337127 | A1 | 11/2016 | Schultz et al. | |
| 2016/0337354 | A1 | 11/2016 | Smadja et al. | |
| 2017/0061398 | A1 | 3/2017 | Joseph | |
| 2017/0109955 | A1 | 4/2017 | Ernest et al. | |
| 2017/0177855 | A1* | 6/2017 | Costa Faidella | H04L 63/08 |
| 2017/0337549 | A1* | 11/2017 | Wong | G06F 21/6254 |
| 2018/0060496 | A1* | 3/2018 | Bulleit | G16H 10/60 |
| 2018/0285875 | A1* | 10/2018 | Law | G06Q 20/4014 |
| 2018/0285996 | A1* | 10/2018 | Ma | G06Q 50/184 |
| 2019/0172057 | A1* | 6/2019 | Vincent | G06Q 20/382 |
| 2019/0349426 | A1* | 11/2019 | Smith | H04W 4/08 |

OTHER PUBLICATIONS

TokenMarket—Token sales and decentralized funding, https://tokenmarket.net/, Apr. 18, 2018.
Philip Evans et al., Blockchain and Digital Tokens: A Strategic Perspective, Dec. 1, 2016, https://www.bcg.com/blockchain/thinking-outside-the-blocks.html.
Confirmation from Bitcoin Wiki, https://en.bitcoin.it/wiki/Confirmation, Mar. 16, 2018.
Average Confirmation Time, Blockchain, https://blockchain.info/charts/avg-confirmation-time, Apr. 18, 2018.
Litecoin Block Time historical chart, BitInfo, https://bitinfocharts.com/comparison/litecoin-confirmationtime.html, Apr. 18, 2018.
Ahmed Banafa, IoT and Blockchain Convergence: Benefits and Chanllenges, IEEE Internet of Things, Jan. 10, 2017, http://iot.ieee.org/newsletter/january-2017/iot-and-blockchain-convergence-benefits-and-challenges.html.
Konstantinos Kolias et al., "Leveraging Blockchain-based protocols in IoT systems", National Institute of Standard and Technology (NIST) and George Mason University, http://csrc.nist.gov/groups/SMA/ispab/documents/minutes/2016-06/1_iot_stavrous.pdf, Jun. 2016.
Aissam Outchakoucht et al: "Dynamic Access Control Policy based on Blockchain and Machine Learning for the Internet of Things", International Journal of Advanced Computer Science and Applications, vol. 8, No. 7, Jan. 1, 2017 (Jan. 1, 2017), XP055569041.
Aafaf Ouaddah et al: "FairAccess: a new 1-14 Blockchain-based access control framework for the Internet of Things : FairAccess: a new access control framework for IoT", Security and Communication Networks, vol. 9, No. 18, Dec. 1, 2016 (Dec. 1, 2016), pp. 5943-5964, XP055415302.
Gidofalvi et al: "When and Where Next: 1-14 Individual Mobility Prediction", Nov. 6, 2012 (Nov. 6, 2012), p. 2012, XP055660951, Retrieved from the Internet: URL:https://people.kth.se/-gyozo/docs/08GidofalviWAWNACMGIS12CRC.pdf.
Extended European Search Report dated Jan. 31, 2020, issued in European Application No. 18788459.8.
Indian Office Action dated Jun. 1, 2020, issued in Indian Patent Application No. 201741013738.

* cited by examiner

METHOD AND APPARATUS FOR ACCESS CONTROL IN DISTRIBUTED BLOCKCHAIN-BASED INTERNET OF THINGS (IOT) NETWORK

CROSS-REFERENCE TO RELATED APPLICATION(S)

This application is based on and claims priority under 35 U.S.C. § 119 to an Indian patent application number 201741013738, filed on Apr. 18, 2017, in the Indian Intellectual Property Office, and to an Indian patent application number 201741013738, filed on Dec. 21, 2017, in the Indian Intellectual Property Office, the disclosure of which is incorporated by reference herein its entirety.

BACKGROUND

1. Field

The disclosure relates to security in an Internet of things (IoT) network. More particularly, the disclosure relates to a method and apparatus for access control in a distributed blockchain-based IoT network.

2. Description of Related Art

Technology based on IoT is gradually becoming ubiquitous, covering several parts of lives.

Conventional IoT infrastructure is based on centralized systems with a server controlling secure access to various entities in an IoT network. Typically, such infrastructure is reliant on trusted communication between nodes in the IoT network and a centralized server.

IoT infrastructure involve billions of interactions among IoT devices and user devices. One of the associated issues with conventional IoT infrastructure is that most connected devices or nodes are ill-equipped with security measures to prevent malevolent and improper usage. There is no way to identify which transactions are legitimate transactions for a valid user and which transactions are invalid. Security pertaining to IoT infrastructure is limited to pins and passwords to access a valid system. In case of potential theft of the pins and passwords, there is no mechanism to provide an enhanced secure access to the IoT system. Further, conventional IoT infrastructure lacks continuous security. For example, a user may access an IoT network based on a successful validation of a password. However, with such a validation scheme, continuous monitoring of user activity is compromised. Further, the IoT network is open to external threats such as hacking, data theft and the like, when the IoT network is made accessible to the user.

Other issues of conventional IoT infrastructure pertain to limitations in automatically differentiating various users to provide appropriate access levels.

Thus, there remains a need for mechanisms through which distributed access control of the IoT network with continuous security can be achieved.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for access control in a distributed blockchain-based Internet of things (IoT) network. The method comprises receiving, by a first device, a request and an IoT token from a second device for a transaction, where the IoT token is dynamically allocated based on a sequence of transaction blocks from a blockchain performed in the IoT network. Further, the method comprises validating, by the first device, the IoT token based on information available on the blockchain, and allowing, by the first device, the transaction from the second device based on a successful validation of the IoT token.

Additional aspects will be set forth in part in the description which follows and, in part, will be apparent from the description, or may be learned by practice of the presented embodiments.

In accordance with an aspect of the disclosure, an electronic device in a system including a plurality of external devices is provided. The electronic device includes a memory configured to store instructions, a communication circuitry, and a processor operably coupled to the communication circuitry, the processor configured to execute the stored instructions to transmit, by using the communication circuitry, a first signal for requesting to access an external device among the plurality of external devices, to the external device, receive, by using the communication circuitry, a second signal for requesting to provide a token stored in the electronic device, from the external device, the token being generated based on at least part of a block chain including at least one block that is respectively associated with at least one external device that has been accessed by the electronic device among the plurality of external devices, in response to the reception, transmit, by using the communication circuitry, information on the token, to the external device, receive, by using the communication circuitry, a third signal for indicating to allow the access of the electronic device, from the external device, the third signal being transmitted from the external device in response to identifying, by the external device, to validate the token in all of the plurality of external devices, and access, by using the communication circuitry, the external device based at least in part on the third signal for indicating to allow the access of the electronic device.

In accordance with another aspect of the disclosure, an electronic device in a system including a plurality of external devices is provided. The electronic device includes a memory configured to store instructions, a display, a communication circuitry, and a processor operably coupled to the communication circuitry, the processor configured to execute the stored instructions to display a first user interface including at least one object corresponding to at least one external device accessible by the electronic device among the plurality of external devices, in response to detecting an input on an object among the at least one object, transmit, to the external device, a first signal for requesting to access an external device corresponding to the object, receive, from the external device, a second signal for requesting to provide a token generated based on at least part of a block chain, in response to the reception, transmit, to the external device, information on the token, receive, from the external device, a third signal for indicating to allow the access of the electronic device, the third signal being transmitted from the external device in response to identifying, by the external device, to validate the token in all of the plurality of external devices, and in response to receiving the third signal, display, in the first user interface, a message for indicating to allow the access of the electronic device.

In another aspect of the disclosure, a non-transitory computer readable storage medium having a computer readable program stored therein is provided. The computer readable program, when executed on at least one processor in a server, configures the at least one processor to receive, from an external device among a plurality of external devices included in a system associated with the server, information on a token that is provided from the an electronic device to the external device, transmit, to remaining external devices among the plurality of external devices, the information on the token, receive, from the plurality of external devices, information on results validating the token in the plurality of external devices respectively; and transmit, to the external device, a signal for indicating to allow an access of the electronic device to the external device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
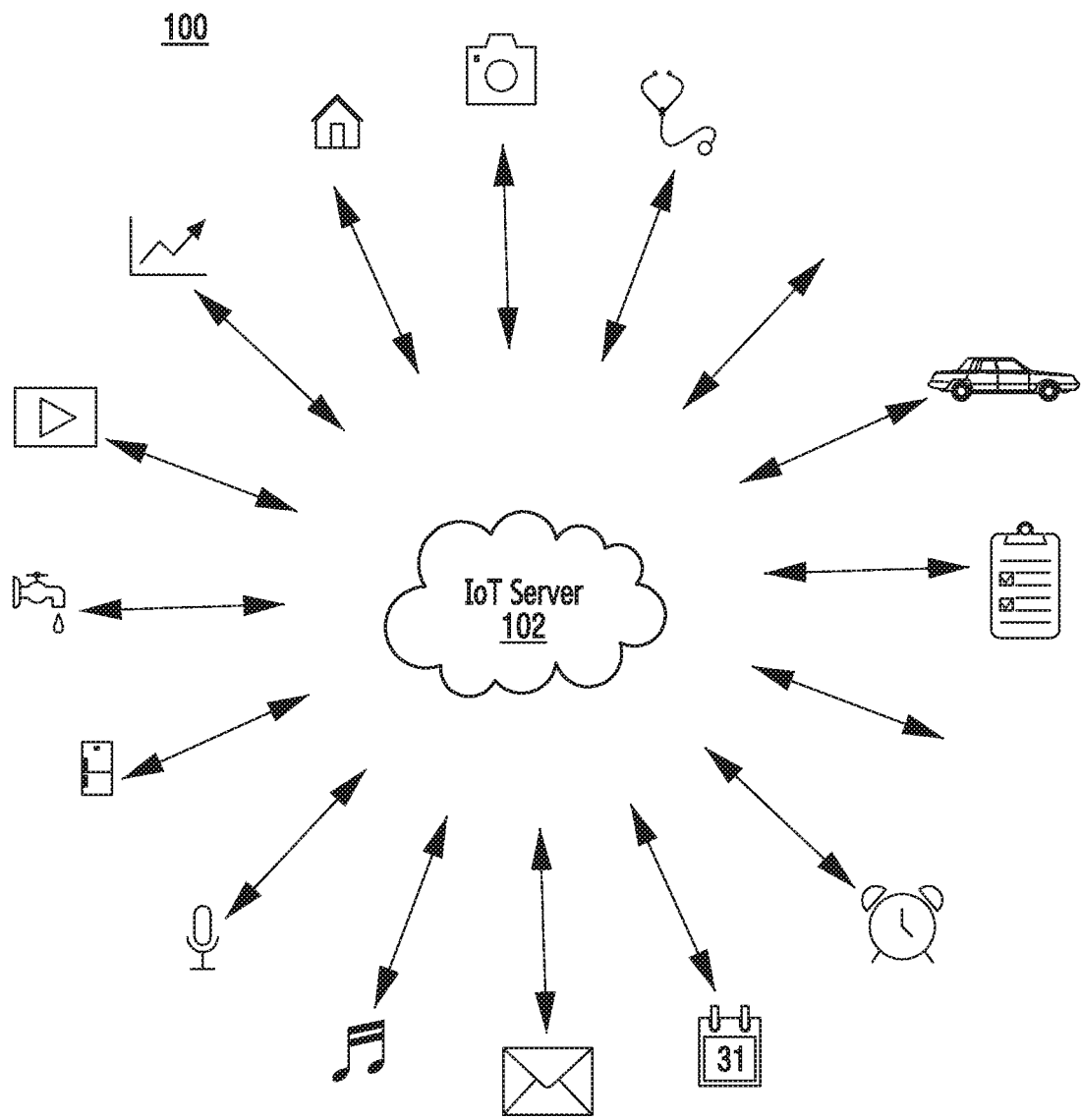
FIG. 1 illustrates a centralized Internet of things (IoT) network, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "IoT" and variations thereof, as used herein, refers to "Internet of Things". As such, the terms "IoT" and "TOT" can be used interchangeably. The term "user trail" and "transaction trail" can be used interchangeably.

Conventional methods of access control in an IoT network involve the use of a centralized server. The centralized server is connected to various devices or nodes in an IoT network. A user is authenticated, by the centralized server, to access a node in the IoT network. The centralized server validates a password or a pin provided by the user at the node. Such a mechanism is limited in functionality, specifically, in aspects relating to identification of legitimate transactions. Security is also compromised if pins or passwords pertaining to the node in the IoT network are stolen. Continuous security is also compromised as an individual gains access simply through the validation of a password.

Unlike the conventional methods, the proposed method utilizes a blockchain mechanism to provide continuous security to a user accessing the IoT network. Access to the IoT network is dependent not only on validation of a password but also on the legitimate presence of a user in a valid zone of the IoT network. Access to a node in a valid zone of the IoT network is provided after evaluating the presence of a legitimate user and a transaction. A transaction is an interaction between a user and the node of the IoT network. The transaction is stored in a blockchain and can be mined from the blockchain to build a user's transaction trail (or user trail). With every transaction added in the user trail there are a set of legitimate transactions corresponding to the next steps which the user can take. All the other infeasible transactions are marked disabled. Hence, as the user is authenticated for access to the IoT network, the user is enabled only to the next feasible or legitimate set of transactions. This situation is evaluated at every step to provide continuous security.

Each transaction in the block-chain is added after a consensus between all the nodes of the IoT network is achieved. Also, a digital IoT Token repository (IoT token wallet) is provided to the user to facilitate seamless authentication. IoT-tokens (based on cryptocurrency) are generated for the next legitimate set of transactions after validating the user trail in the blockchain.

Continuous security is provided based on the user's previous transaction trail. Further, the mechanism is provided where security is dependent not only on pins and password but also on the presence of the user and/or the user-devices in valid or legitimate zones of the transaction trail.

Further, evaluation of the set of valid zones (i.e., physical, or logical) and legitimate transactions are estimated with every user transaction in the blockchain. Accessibility to nodes in the IoT network are provided according to user-location in a multi-dimensional space of user-device-activity within the IoT network.

Referring now to the drawings, and more particularly to FIGS. 1 through 19, where similar reference characters denote corresponding features consistently throughout the figures, there are shown preferred embodiments.

FIG. 1 illustrates a system for access control in an IoT network according to an embodiment of the disclosure.

Referring to FIG. 1, a system 100 includes an IoT server 102 that provides centralized control over providing access of the various nodes in the IoT network to a second device. The nodes of the IoT network include home security devices, lighting systems, speakers, television sets, phones, faucets, and the like. A user provides a password at the node. The password may be, but not limited to, a pin, text input, gestures, and biometrics. The password is validated at the IoT server 102 and accordingly access is provided to the user. For example, in a house with an IoT network, a user may provide a password to enter the house. A home security device installed at the entrance of the house accepts the password and transmits the received password to the IoT server 102. If the password is successfully validated at the IoT server 102, the IoT server 102 transmits a signal to the home security device to allow the user into the house. Any new user may have to register with the IoT server 102 to obtain personalized passwords that are input to any of the nodes in the IoT network. Based on a successful validation of the password, the user is permitted to access the IoT network or utilize the node in the IoT network.

As discussed above, the system 100 is limited in functionality, specifically, in aspects of security. Security is compromised if pins or passwords pertaining to the node in the IoT network are stolen. Continuous security is also compromised as an individual gains access simply through the validation of a password.

Figure 2A:
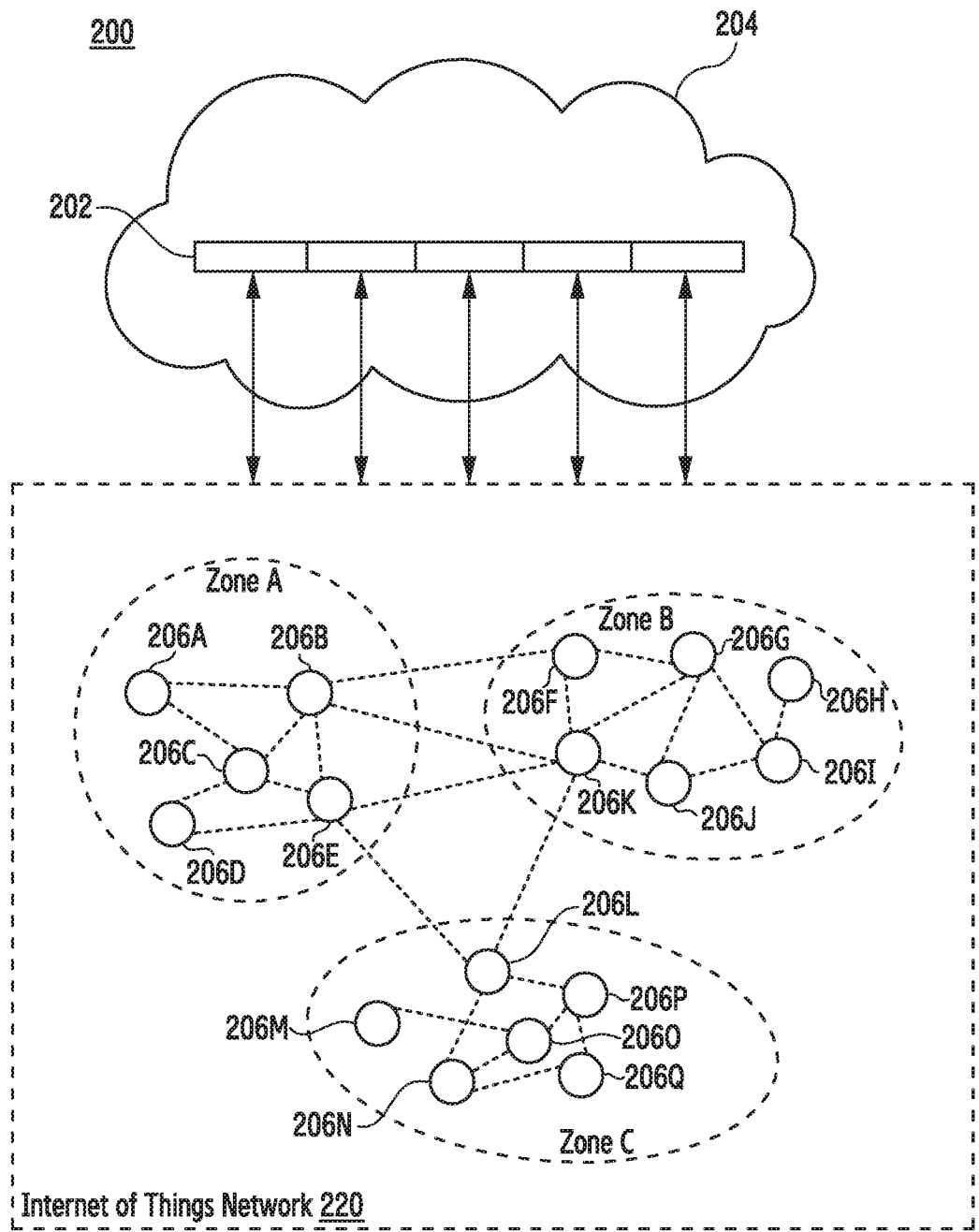
FIG. 2A illustrates a distributed IoT network, according to an embodiment of the disclosure.

FIG. 2A illustrates a system for access control in a distributed blockchain-based IoT network according to an embodiment of the disclosure.

Referring to FIG. 2A, a system 200 includes an IoT network 220 that includes various nodes that are segregated into zones such as zone A, zone B and zone C, as shown. The zone A includes nodes 206A, 206B, 206C, 206D and 206E. The zone B includes the nodes 206F, 206G, 206H, 206I, 206J and 206K. The zone C includes the nodes 206L, 206M, 206N, 206O, 206P and 206Q. The nodes in each of the zones A, B and C include home security devices, lighting systems, speakers, television sets, phones, faucets, and the like. A blockchain 202 over a communication network (i.e., cloud) 204 is utilized to provide continuous security to a user based on the user's previous transaction trail pertaining to the IoT network 220. The blockchain 202 is a sequence of data blocks or records that are linked and secured using cryptography. Each block includes a hash pointer as a link to a previous block, a timestamp and transaction data. The transaction data further includes data pertaining to activities of a user with respect to a node in the IoT network 220.

The blockchain 202 serves as a distributed ledger managed by the IoT network 220. The blockchain 202 is a sequence of transaction blocks of users performed over the IoT network 220. Data in any of the blocks of the blockchain can be changed only with altering the data stored in each of the subsequent blocks in the blockchain. Transaction data is added through consensus protocols tolerating crash failures or Byzantine failures.

Figure 2B:
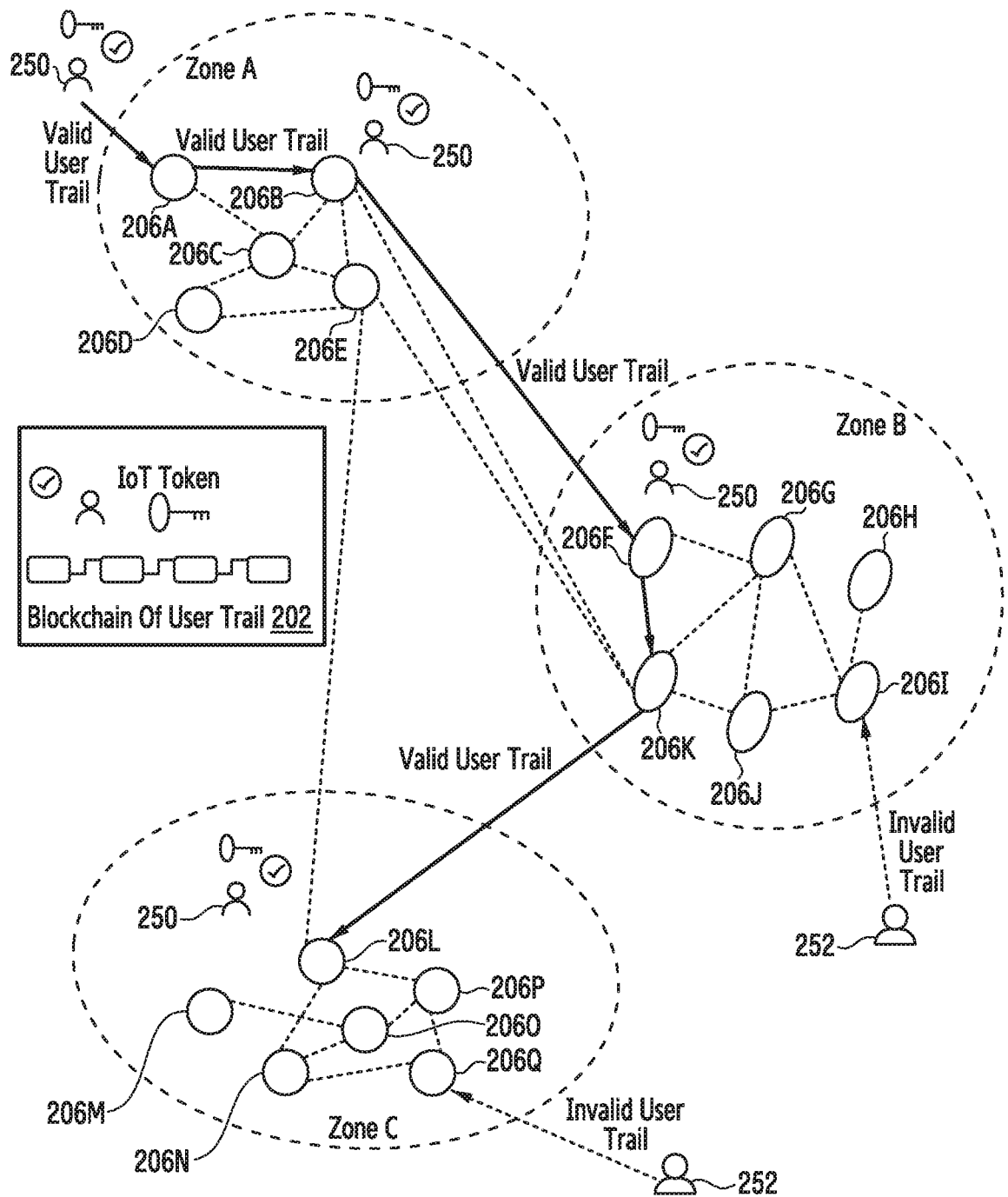
FIG. 2B illustrates a distributed IoT network with transactions occurring over a legitimate transaction trail, according to an embodiment of the disclosure.

FIG. 2B illustrates an IoT network with a 250 having an electronic device according to an embodiment of the disclosure.

Referring to FIG. 2B, the electronic device requests access to the zone A. The electronic device is provided access to the various nodes of the IoT network 220 if the electronic device transitions from one node to another and from one zone to another using a valid transaction trail as shown in FIG. 2B. The electronic device can be, but not limited to, a mobile phone, a tablet computer, a smart watch, or a fob.

The electronic device is detected by any of the nodes in the zone A or by the node 206A. The electronic device transmits a request and an IoT token to the node 206A for a transaction. The IoT token is dynamically allocated based on the sequence of transaction blocks in the blockchain 202. The node 206B validates the IoT token based on information available in the blockchain 202. The node 206A allows the transaction based on a successful validation of the IoT token. The node 206A further updates the IoT token of the device of the user 250. The transaction and the updated IoT token is added to the blockchain after consensus among all the nodes in the IoT network 220, linked to the blockchain 202. The transaction and updated IoT token are added to the blockchain 202 using any or a combination of crypto-token protocol, a light cryptographic consensus protocol and a variable cryptographic consensus protocol. The light cryptographic consensus protocol is determined based on a combination of practical byzantine fault tolerance (PBFT), and federated byzantine agreement (FBA). The updated IoT token is stored by the node 206A.

The IoT token can be any data object that is utilized to authorize access to any of the nodes in the zones A, B and C. The IoT token is stored in a repository in each of the nodes of the IoT network 220. The updated IoT token is further stored on the electronic device. The IoT token is a unique token specific to any node of the IoT network 220 and the electronic device. The IoT token can include a plurality of attributes. The plurality of attributes include any or a combination of a unique identifier of the device, a unique identifier representative of a transaction and a unique serial identifier of the token.

In an example, the user 250 with the electronic device is detected by a home security device (or the node 206A) outside a house with the IoT network 220. The user 250 is validated by the node 206A, which in this example is the home security device. In some embodiments, the user 250 can also be detected by providing a password or biometric authentication if the electronic device does not provide any IoT tokens in conjunction with the access request. An IoT token provided by the electronic device or provided through password/biometric authentication is validated by the home security device or the node 206A. Upon successful validation, the user 250 can enter the house and further IoT tokens based on future transactions that the electronic device can have with any of the nodes in the IoT network 220. Potential transactions include activating a lighting system in the house, activating a thermostat to maintain a specific temperature in the house and the like. A legitimate transaction trail in the current example is dependent on patterns of past transactions of various users entering the house. Any user attempting to enter the house through another room such as the kitchen or the bedroom is immediately flagged as an invalid transaction. As shown in FIG. 2B, a user 252 is flagged with an invalid user trail.

Generating updated IoT tokens by the node 206A includes predicting future transaction trails associated with the user 250 in the blockchain. Access requests to each of the nodes in any of the zones A, B and C includes the aforementioned methods.

In some embodiments, continuous security can be provided during transitioning between the zones of the IoT network 220. The user 250 is provided access to all the nodes in the zone A upon successful validation of the IoT token by any of the nodes in the zone A. Updated IoT tokens associated with transitioning to the zone B is accordingly provided to the electronic device. When the user 250 successfully transitions to the zone B, updated IoT tokens associated with the nodes on the zone C are stored in the electronic device.

In some embodiments, transactions can be validated between the nodes of the IoT network 220. For example, the node 206F can request IoT tokens pertaining to the zone C from any of the nodes of the zone C. The request is further broadcast over the blockchain and upon successful consensus, IoT tokens pertaining to the zone C, are provided to the node 206F and stored accordingly.

Figure 3A:
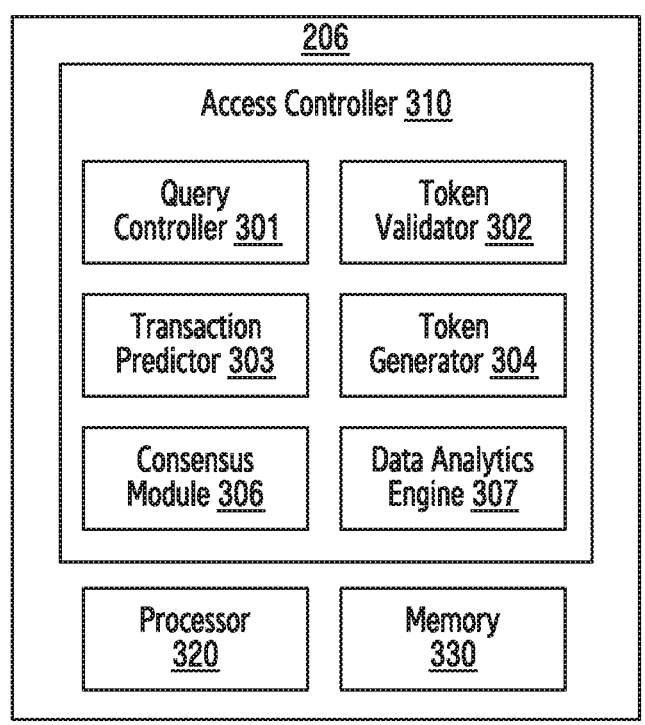
FIG. 3A is a block diagram illustrating various hardware components of an apparatus in an IoT network, according to an embodiment of the disclosure.

FIG. 3A illustrates hardware components of an apparatus for blockchain-based distributed access control in an IoT network according to an embodiment of the disclosure. The apparatus can be any of the nodes in the IoT network 220.

Referring to FIG. 3A, the apparatus is shown to be that of a node 206. The node 206 includes an access controller 310, a processor 320 and a memory 330. The access controller 310 includes a query controller 301, a token validator 302, a transaction predictor 303, a token generator 304, a consensus module 306 and a data analytics engine 307. The access controller 310 receives the access request and the IoT token from the electronic device for a transaction. The IoT token is validated based on information available on the blockchain 202. The transaction is allowed upon successful validation of the IoT token.

The processor 320 may be, but not restricted to, a central processing unit (CPU), a microprocessor, or a microcontroller. The processor 320 is coupled to the memory 330 and the access controller 310. The processor 320 executes sets of instructions stored on the memory 330. Any updated IoT tokens are stored in the memory 330.

The query controller 301 generates a request for a transaction over the IoT network 220. The query controller 301 can be any processing unit that receives or generates queries pertaining to transaction requests over the IoT network 220. For example, the query controller 301 receives the access request and the IoT token from the electronic device. The IoT token is validated by the token validator 302, based on information available on the blockchain 202. Upon successful validation, the access controller 310 allows the transaction pertaining to the request to occur.

The transaction predictor 303 is any chipset or processing unit that determines future transaction trails of the user 250 in the IoT network 220. Based on the determined transaction trails, the token generator 304 generates updated IoT tokens associated with the zones B and C or any other nodes potentially on the future transaction trails of the user 250. The access controller 310 dynamically updates the IoT tokens of the electronic device. The associated transaction and the updated IoT token is broadcast to the nodes in the IoT network 220. The consensus module 306 utilizes one of a crypto-token protocol, a light cryptographic consensus protocol and a variable cryptographic consensus protocol, consensus is achieved, thereby adding the transaction and the updated IoT token to the blockchain 202. Accordingly, the updated IoT tokens are stored on the electronic device and the memory 330.

In some embodiments, the token validator 302 validates the IoT token based on information available on the blockchain by generating a smart contract. A smart contract is a set of instructions that is stored in the memory 330 and interacts with various components of the blockchain 202. The smart contract verifies parameters like user permission levels, and legitimate transaction trails before allowing the IoT token to be validated.

The data analytics engine 307 determines various statistical data based on the transaction trails of the user 250. The data analytics engine 307 develops models through machine learning through which faults in the IoT network 220 can be mitigated. The data analytics engine 307 is coupled to the distributed Hyperledger™ and its associated transaction pool to enhance fault tolerance and to execute smart contracts.

Figure 3B:
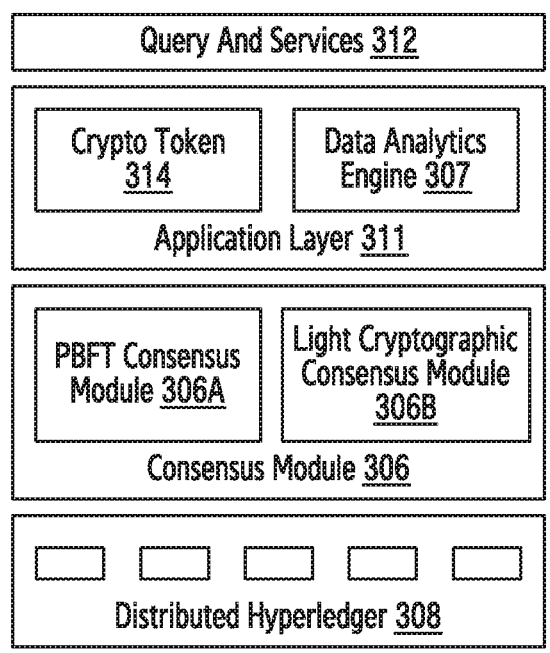
FIG. 3B illustrates an architecture for blockchain-based distributed access control in an IoT network, according to an embodiment of the disclosure.

FIG. 3B illustrates architecture pertaining to blockchain consensus according to an embodiment of the disclosure.

Referring to FIG. 3B, a query and services block 312 includes hardware pertaining to receiving and/or generating transaction requests over the IoT network 220. The query controller 301 receives or generates queries pertaining to transaction requests over the IoT network 220. An application layer includes a crypto token 314 stored in the memory 330. The crypto token 314 can also be generated by the token generator 304 or validated by the token validator 302. Any new transaction or updated token to be added to the blockchain 202 is validated through a consensus performed by the consensus module 306. The consensus is achieved through any of PBFT consensus module 306A or a light cryptographic consensus module 306B. Analytics over the distributed Hyperledger™ 308 is performed by the data analytics engine 307.

Figure 4:
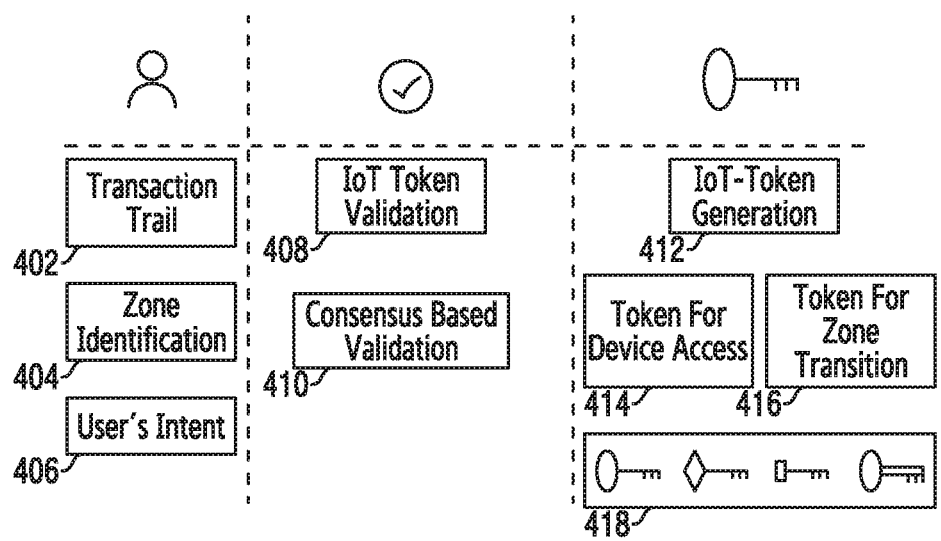
FIG. 4 is a flow diagram illustrating a method for updating a blockchain ledger entry in connection with a blockchain-based distributed access control in an IoT network, according to an embodiment of the disclosure.
Figure 4:
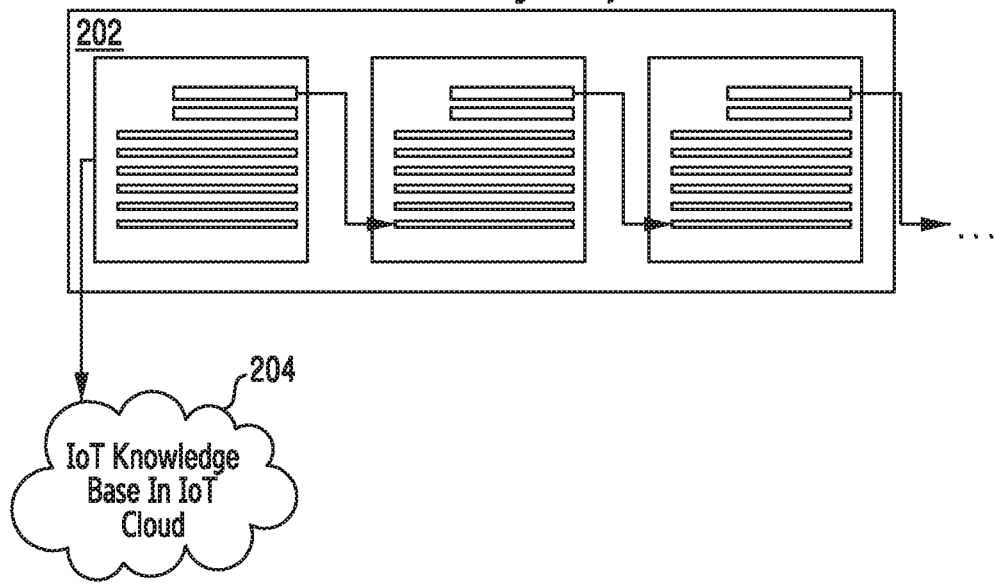

FIG. 4 is a flow diagram illustrating a method for updating a blockchain ledger entry in connection with a blockchain-based distributed access control in an IoT network, according to an embodiment of the disclosure.

Referring to FIG. 4, in a method 400 the electronic device requests access to the zone A. The user 250 is provided access to the various nodes of the IoT network 220 if the electronic device transitions from one node to another and from one zone to another using a valid transaction trail, as shown in FIG. 2B. At operation 402, the transaction trail of the user 250 is determined. At operation 404, the electronic device is detected by any of the nodes in the zone A or by the node 206A. At operation 406, the intent of the user 250 is determined, i.e., the node in the zone A with which the electronic device requests access to is determined.

The IoT token is dynamically allocated based on the sequence of transaction blocks in the blockchain 202. At operation 408, the token validator 302 validates the IoT token based on information available in the blockchain 202. At operation 410, the node 206A allows the transaction based on a successful validation of the IoT token. The node 206A further updates the IoT token of the electronic device. The transaction and the updated IoT token is added to the blockchain after consensus among all the nodes in the IoT network 220, linked to the blockchain 202. The transaction and updated IoT token are added to the blockchain 202 using any or a combination of crypto-token protocol, a light cryptographic consensus protocol and a variable cryptographic consensus protocol. The light cryptographic consensus protocol is determined based on a combination of PBFT, and FBA. The updated IoT token is stored by the node 206A.

At operation 412, the transaction predictor 303 determines future transaction trails of the user 250 in the IoT network 220. Based on the determined transaction trails, at operation 414, the token generator 304 generates updated IoT tokens associated any other nodes potentially on the future transaction trails of the user 250. At operation 416, the token generator generates updated IoT tokens associated with the zones B and C. The access controller 310 dynamically updates the IoT tokens of the electronic device. The associated transaction and the updated IoT token is broadcast to the nodes in the IoT network 220. The consensus module 306 utilizes one of a crypto-token protocol, a light cryptographic consensus protocol and a variable cryptographic consensus protocol, consensus is achieved, thereby adding the transaction and the updated IoT token 418 to the blockchain 202. Accordingly, the updated IoT tokens are stored on the electronic device, the memory 330 and/or the communication network (i.e., cloud) 204.

Figure 5:
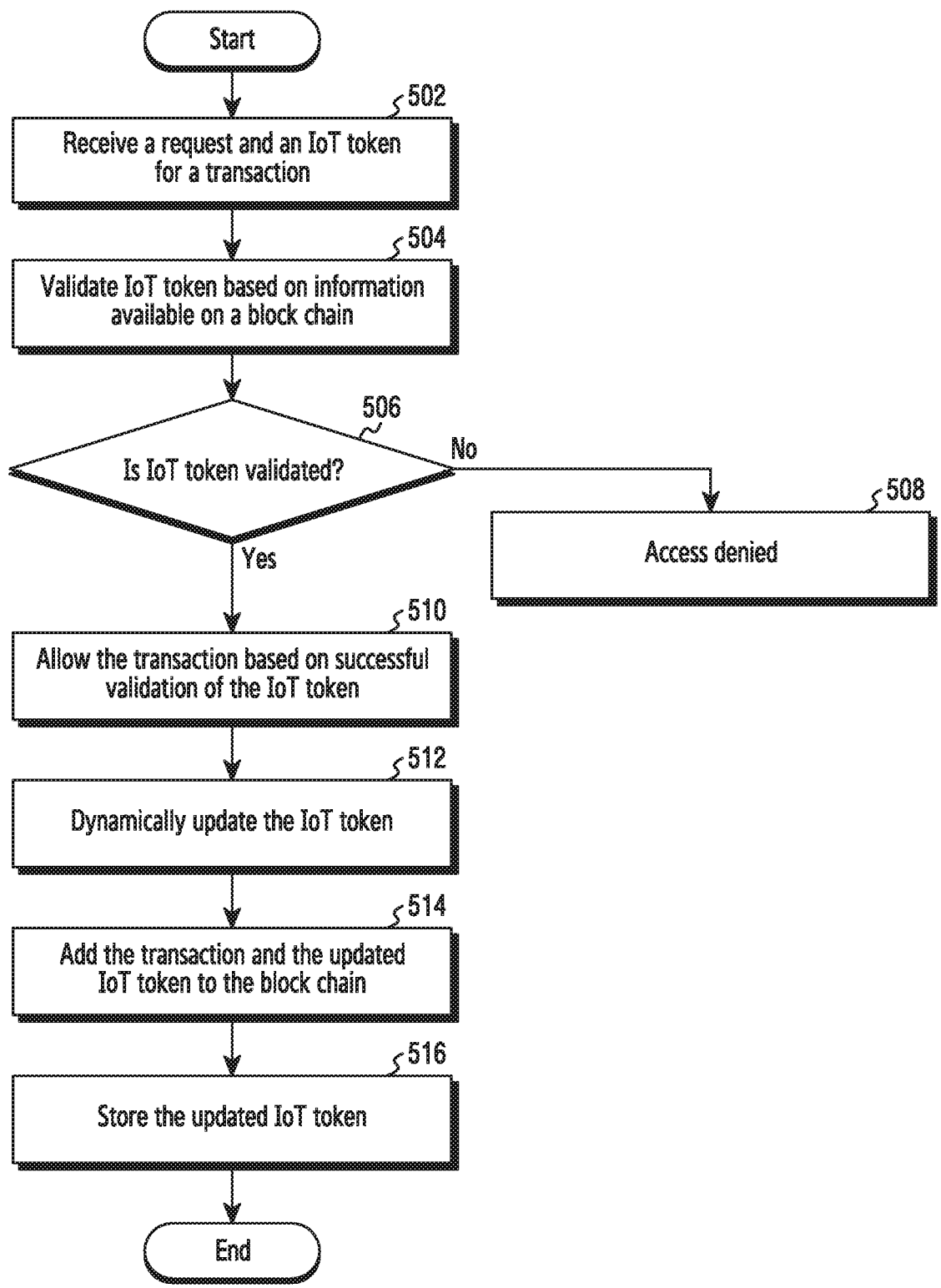
FIG. 5 is a flow diagram illustrating a method for blockchain-based distributed access control in an IoT network, according to an embodiment of the disclosure.

FIG. 5 illustrates a flow diagram that depicts method for blockchain-based distributed access control in the IoT network 220 according to an embodiment of the disclosure.

Referring to FIG. 5, at operation 502, the query controller 301 receives a request and IoT token for a transaction. At operation 504, the IoT token is validated by the token validator 302, based on information available on the blockchain 202. Upon successful validation at operation 506, at operation 510, the access controller 310 allows the transaction pertaining to the request to occur. If validation is unsuccessful, access is denied at operation 508.

The transaction predictor 303 determines future transaction trails of the user 250 in the IoT network 220. Based on the determined transaction trails, at operation 512, the token generator 304 generates updated IoT tokens associated with the zones B and C or any other nodes potentially on the future transaction trails of the user 250. The access controller 310 dynamically updates the IoT tokens of the electronic device. The associated transaction and the updated IoT token is broadcast to the nodes in the IoT network 220. The consensus module 306 utilizes one of a crypto-token protocol, a light cryptographic consensus protocol and a variable cryptographic consensus protocol, consensus is achieved. At operation 514, accordingly, the transaction and the updated IoT tokens are added to the blockchain 202. At operation 516, the updated IoT tokens are stored on the electronic device, the memory 330.

Figure 6:
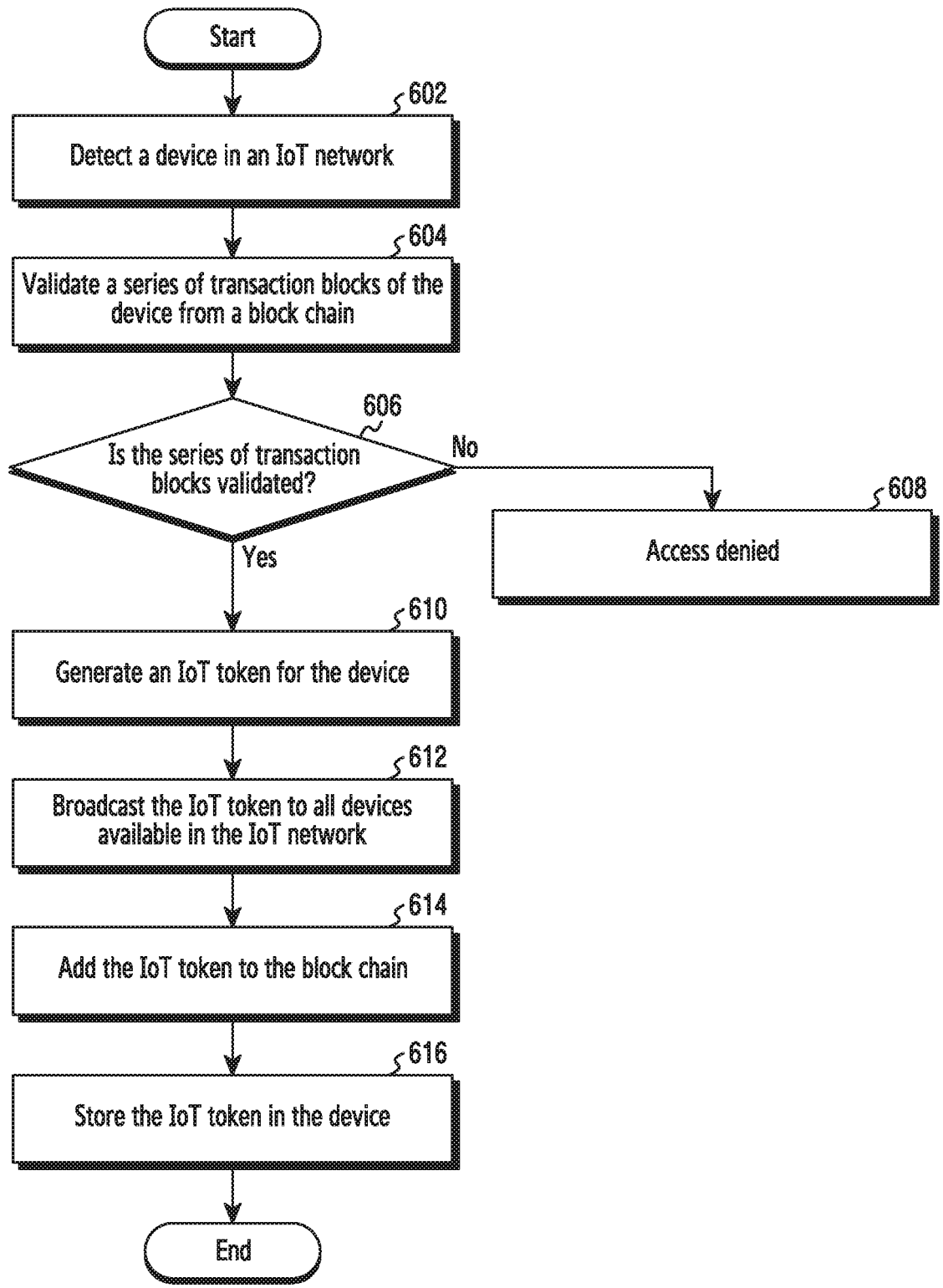
FIG. 6 is a flow diagram illustrating a method for detecting an electronic device in an IoT network and validating a series of transaction blocks of the electronic device, according to an embodiment of the disclosure.

FIG. 6 is a flow diagram illustrating a method for detecting an electronic device of a user in an IoT network, and validating a series of transaction blocks of the electronic device in the IoT network according to an embodiment of the disclosure.

Referring to FIG. 6, at operation 602, the query controller 301 detects the electronic device of the user 250 for a transaction. At operation 604, the token validator 302 validates the identity of the electronic device, based on information available on the blockchain 202. Upon successful identification, the access controller 310 allows future transactions pertaining to the identified the electronic device of the user 250 to occur. If validation is unsuccessful, access is denied at operation 608.

The transaction predictor 303 determines future transaction trails of the user 250 in the IoT network 220. Based on the determined transaction trails at operation 606, at operation 610, the token generator 304 generates IoT tokens associated with the zones A, B and C or any other nodes potentially on the future transaction trails of the user 250. At operation 612, the associated transaction and the updated IoT token are broadcast to the nodes in the IoT network 220. The consensus module 306 utilizes one of a crypto-token protocol, a light cryptographic consensus protocol and a variable cryptographic consensus protocol, consensus is achieved. At operation 614, accordingly, the transaction and the IoT token are added to the blockchain 202. At operation 616, the IoT tokens are stored on the electronic device of the user 250 and the memory 330.

Figure 7:
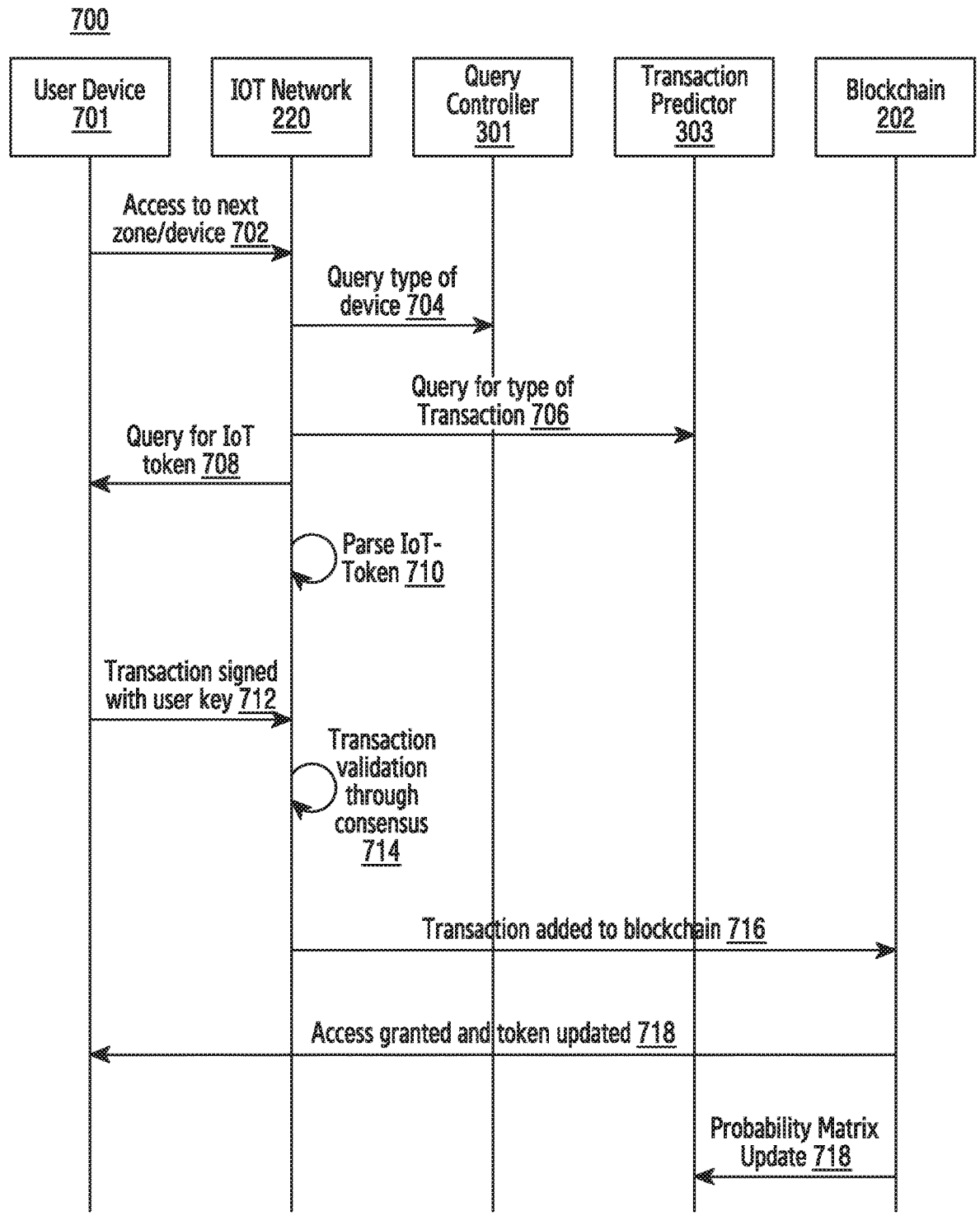
FIG. 7 is a sequence diagram for blockchain-based distributed access control in an IoT network, according to an embodiment of the disclosure.

FIG. 7 illustrates a sequence diagram depicting a method of validating a transaction between a user having a user device and a node according to an embodiment of the disclosure.

Referring to FIG. 7, in a system 700 a user device 701 is the electronic device of the user 250. At operation 702, the user device 701 generates a request for a transaction over the IoT network 220. At operation 704, based on the access request, the query controller 301 further receives a query with regard to the type of device in the IoT network 220 being requisitioned by the user device 701. The query controller 301 can be on any node of the zone A.

At operation 706, the transaction predictor 303 determines the type of transaction being requested by the user device 701. Based on the determined type of transaction, the user device 701 receives a request for the corresponding IoT token, at operation 708. At operation 710, the IoT token is parsed and validated by the token validator 302, based on information available on the blockchain 202. Upon successful validation, the access controller 310 allows the transaction pertaining to the request to occur.

At operation 712, the user device 701 transmits a private key to the IoT network 220. The private key can be used to generate a digital signature for a blockchain transaction. The digital signature is used to confirm that the transaction is from the user 250. The associated transaction and the IoT token is broadcast to the nodes in the IoT network 220. At operation 714, the consensus module 306 utilizes one of a crypto-token protocol, a light cryptographic consensus protocol and a variable cryptographic consensus protocol, consensus is achieved. At operation 716, the transaction is added to the blockchain 202.

Further, at operation 718, the transaction predictor 303 updates a probability matrix based on the added transaction to determine future transaction trails of the user device 701. Based on the determined transaction trails of the user, the token generator 304 generates updated IoT tokens associated with the zones A, B and C or any other nodes potentially on the future transaction trails of the user device 701. The access controller 310 dynamically updates the IoT tokens of the user device. Accordingly, the updated IoT tokens are stored on the user device 701.

Figure 8:
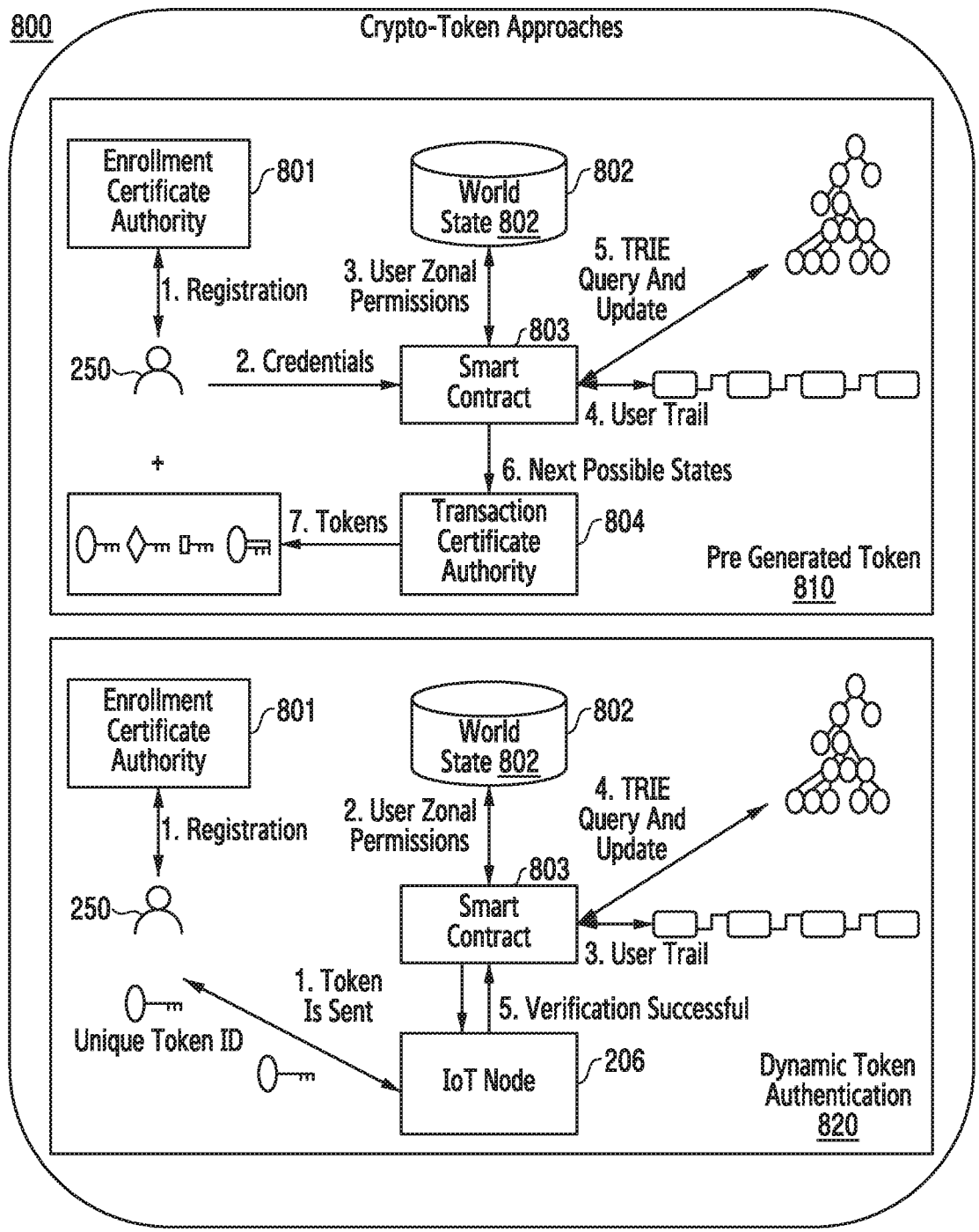
FIG. 8 illustrates a scenario for a crypto-token approach using a pre-generated token to achieve consensus and a scenario for a crypto-token approach using dynamic token authentication to achieve blockchain consensus, according to an embodiment of the disclosure.

FIG. 8 illustrates scenarios for crypto-token approaches for achieving blockchain consensus according to an embodiment of the disclosure.

Referring to FIG. 8, in a method 800 a flow diagram 810 pertaining to an approach based on pre-generated tokens and a flow diagram 820 pertaining to dynamic token authentication is depicted. The user 250 with user device 701 is registered with an enrollment certificate authority 801. Regarding pre-generated tokens, multiple IoT tokens are generated by the token generator 304 for user devices present in any of the zones A, B and C. Further, the IoT tokens are generated based on future transaction trails determined by the transaction predictor 303. For each node and each zone in the IoT network 220, a unique IoT token is generated. The user 250, upon registration with an enrollment certificate authority (such as the query controller 301) is provided with multiple IoT tokens, each IoT token corresponding to a node or a zone.

The token validator 302 validates the IoT token based on information available on the blockchain by triggering a smart contract 803. The smart contract 803 is a set of instructions that is stored in the memory 330 and interacts with various components of the blockchain 202 and a Trie model of the paths taken by the user 250. The smart contract 803 verifies parameters like user permission levels obtained from a world state database 802, legitimate transaction trails before allowing the IoT token to be validated. In some embodiments, permissions pertaining access to a zone can also be determined. The transaction predictor 303 or a transaction certificate authority 804 determines the next possible transactions and provides the user device 701 with the corresponding IoT tokens.

The approach in the method 800 is that of dynamic token authentication. In this approach, only one IoT token is generated by the token generator 304 for each of the user devices detected in any of the zones A, B and C. The user device 701 is registered with the enrollment certificate authority 801 or the query controller 301, upon which a unique IoT token is generated. This IoT token is utilized to access every zone or node in the IoT network 220.

In some embodiments, to allow for better scalability for the blockchain 202, a lightweight consensus protocol is adopted. Such protocols are built by combining two or more consensus protocols such as PBFT and FBA.

Figure 9:
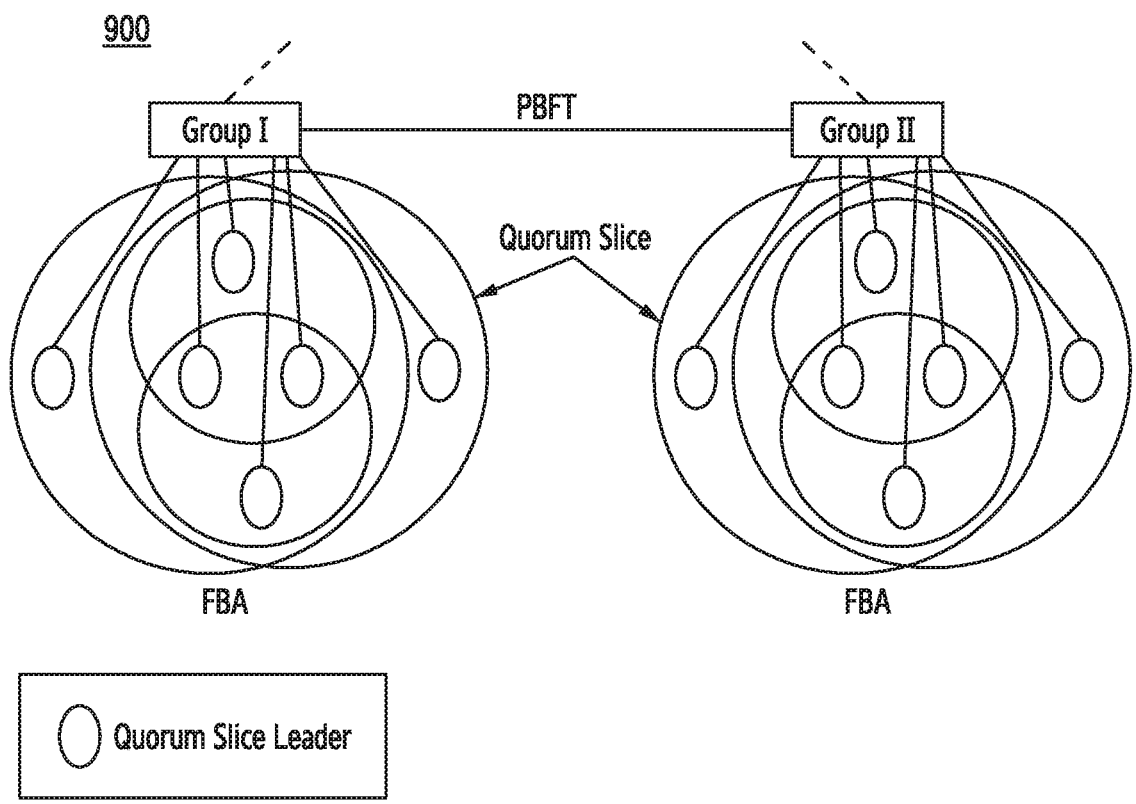
FIG. 9 illustrates a scenario for a light cryptographic consensus protocol to achieve blockchain consensus, according to an embodiment of the disclosure.

FIG. 9 illustrates a scenario for a light cryptographic consensus protocol to achieve blockchain consensus according to an embodiment of the disclosure.

Referring to FIG. 9, in a system 900 the light cryptographic consensus protocol combines the FBA and PBFT consensus protocols. In an embodiment, groups of nodes are present in the IoT network 220, such as the nodes 206A, 206B and 206D in one group and the nodes 206H, 206J and 206K in another group. Each group of nodes represent a collection of devices under a zone. Intra-group consensus is reached using the FBA protocol because many nodes may be present in a zone and a highly scalable consensus mechanism is required for consensus among nodes in a zone. On the other hand, inter-group consensus is reached using the PBFT protocol because the number of zones is generally lesser than the number of nodes in a zone and therefore a permissioned system is more suitable for inter-zone consensus.

In some embodiments, consensus protocols based on a variable cryptographic puzzle can be used for achieving consensus in transactions pertaining to the IoT network 220 and the blockchain 202. In blockchain-based technology used for cryptographic currencies such as Bitcoin™ or Ethererum™, proof of work (PoW) systems require the nodes to provide a proof of work for a block of transactions to be accepted by the network participants. Regarding the IoT network 220 and the blockchain 202, consensus is achieved based on the PoW of the user device 701. For a block of transactional data to be valid, the block must hash to a value less than a current target value. The current target value is based on the probability of a successful block generation. The variable cryptographic puzzle is determined based on the probability of the successful block generation. When the user device 701 requests access to the node 206A, the probability is determined based upon the computational power of the user device 701 and the node 206A. The probability is a function of the computational power of the node 206A and the memory 330. The puzzle solving time is made independent of the computational power and memory of the node 206A to ensure that every node in the IoT network 220 can solve the puzzle in almost equal time.

Figure 10:
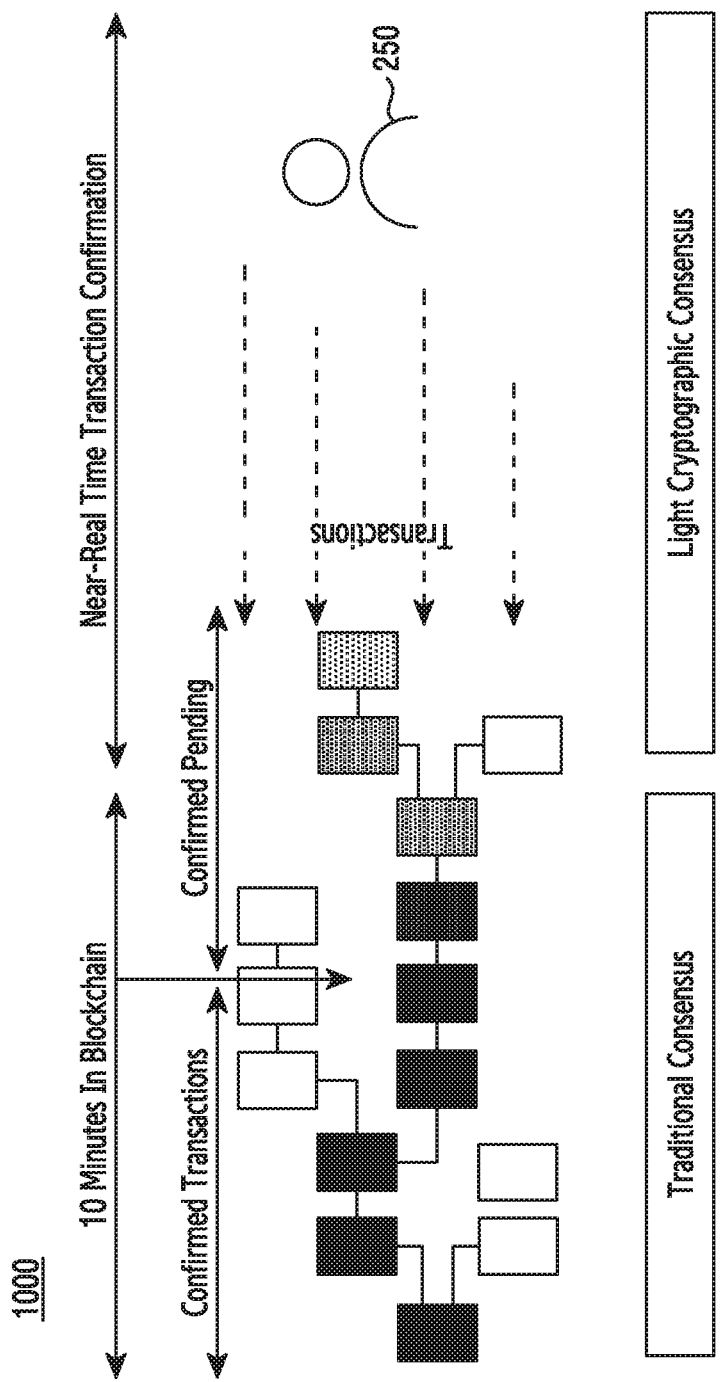
FIG. 10 illustrates a blockchain implementing traditional consensus protocols and a light cryptographic consensus protocol according to an embodiment of the disclosure.

FIG. 10 illustrates a blockchain with traditional consensus protocols and the light cryptographic consensus protocol according to an embodiment of the disclosure.

Referring to FIG. 10, a blockchain 1000 with traditional consensus protocols and the light cryptographic consensus protocol is illustrated. Further depicted is the time taken for consensus to be achieved through traditional consensus protocols and through the lightweight consensus protocol illustrated in FIG. 9. The combination of PBFT and FBA results in a near-real time transaction confirmation.

Figure 11:
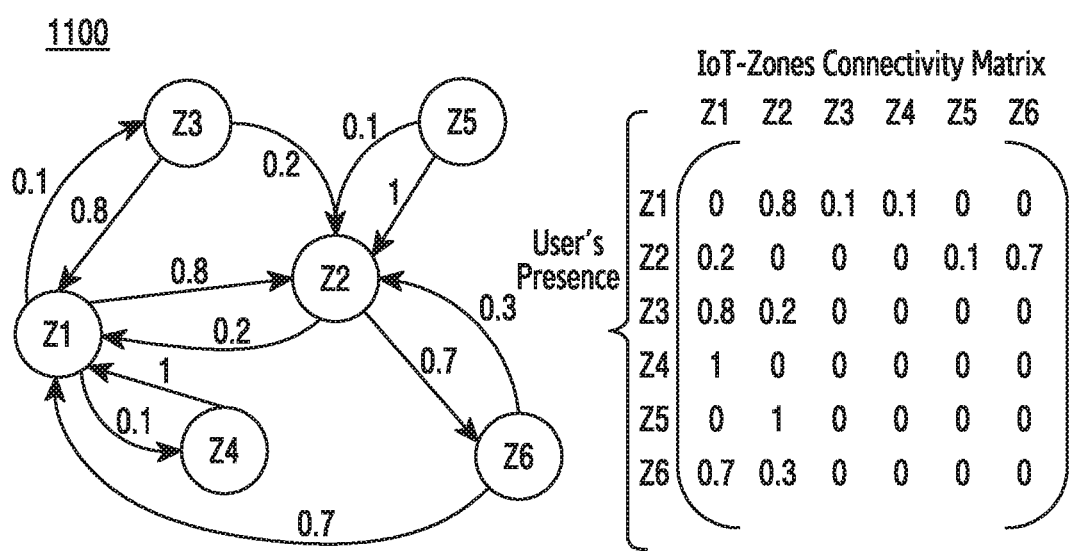
FIG. 11 illustrates a mapping diagram depicting transitions of a user between different zones in an IoT network along with probability matrices concerning a user's presence in each zone of the IoT network, according to an embodiment of the disclosure.

FIG. 11 illustrates a mapping diagram depicting transitions of a user between different zones in an IoT network along with probability matrices concerning a user's presence in each zone of the IoT network 220 according to an embodiment of the disclosure.

Referring to FIG. 11, a zone mapping method 1100 for the determination of future transaction trails by the transaction predictor 303 of the user device 701 among zones Z1, Z2, Z3, Z4, Z5 and Z6 in the IoT network 220 is shown in FIG. 11. The zones Z1, Z2, Z3, Z4, Z5 and Z6 can correspond to any of the zones A, B or C shown in FIG. 2A and other zones in the IoT network 220 not shown in FIG. 2A. The probability of the presence of the user device 701 in each zone of the IoT network 220 is determined. For example, the probability of the user device 701 transitioning to a utilities zone in a smart building from the gymnasium of the smart building is one. Accordingly, when the user device 701 is authenticated to access the gymnasium, the IoT tokens for the utilities zone is added and stored on the user device 701. Any other transaction such as accessing a cafeteria of the smart building is blocked.

Figure 12:
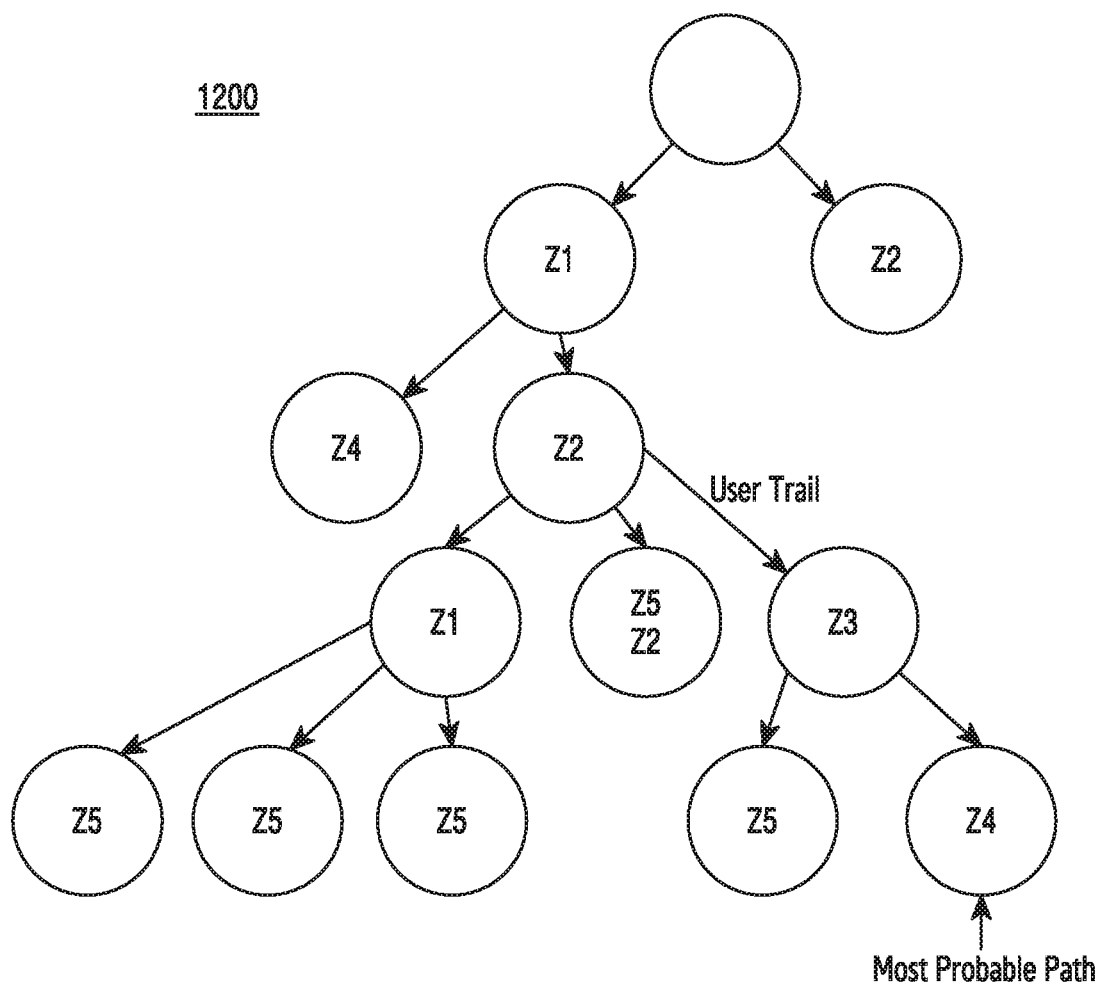
FIG. 12 illustrates a Trie diagram depicting transitions of a user between different zones in an IoT network, according to an embodiment of the disclosure.

FIG. 12 illustrates a Trie diagram depicting a most probable transaction trail of a user device among different zones in an IoT network according to an embodiment of the disclosure.

Referring to FIG. 12, a system 1200 includes a most probable transaction trail of a user device among zones Z1, Z2, Z3, Z4 and Z5 of the IoT network 220. The transaction predictor 303 uses Markov models to determine the probability of future transaction trails. As illustrated in FIG. 12, the probability of the user device 701 transitioning to the zone Z4 is 0.755. Accordingly, updated IoT tokens pertaining to the zone Z4 are generated and based on the consensus of the blockchain 202.

The user device 701 generates a request for a transaction over the IoT network 220. The type of device is determined based on the access request by the query controller 301. The IoT token is validated by the token validator 302, based on information available on the blockchain 202. Upon successful validation, the access controller 310 allows the transaction pertaining to the request to occur.

The transaction predictor 303 determines the type of transaction being requested by the user device 701. Based on the determined transaction trails, the token generator 304 generates updated IoT tokens associated with the zones A, B and C or any other nodes potentially on the future transaction trails of the user device 701. The access controller 310 dynamically updates the IoT tokens of the user device. The associated transaction and the updated IoT token is broadcast to the nodes in the IoT network 220. The consensus module 306 uses one of a crypto-token protocol, a light cryptographic consensus protocol and a variable cryptographic consensus protocol, consensus is achieved, thereby adding the transaction and the updated IoT token to the blockchain 202. Accordingly, the updated IoT tokens are stored on the user device and the memory 330. Further the transaction predictor 303 updates a probability matrix based on the added transaction to determine future transaction trails of the user device 701.

Figure 13A:
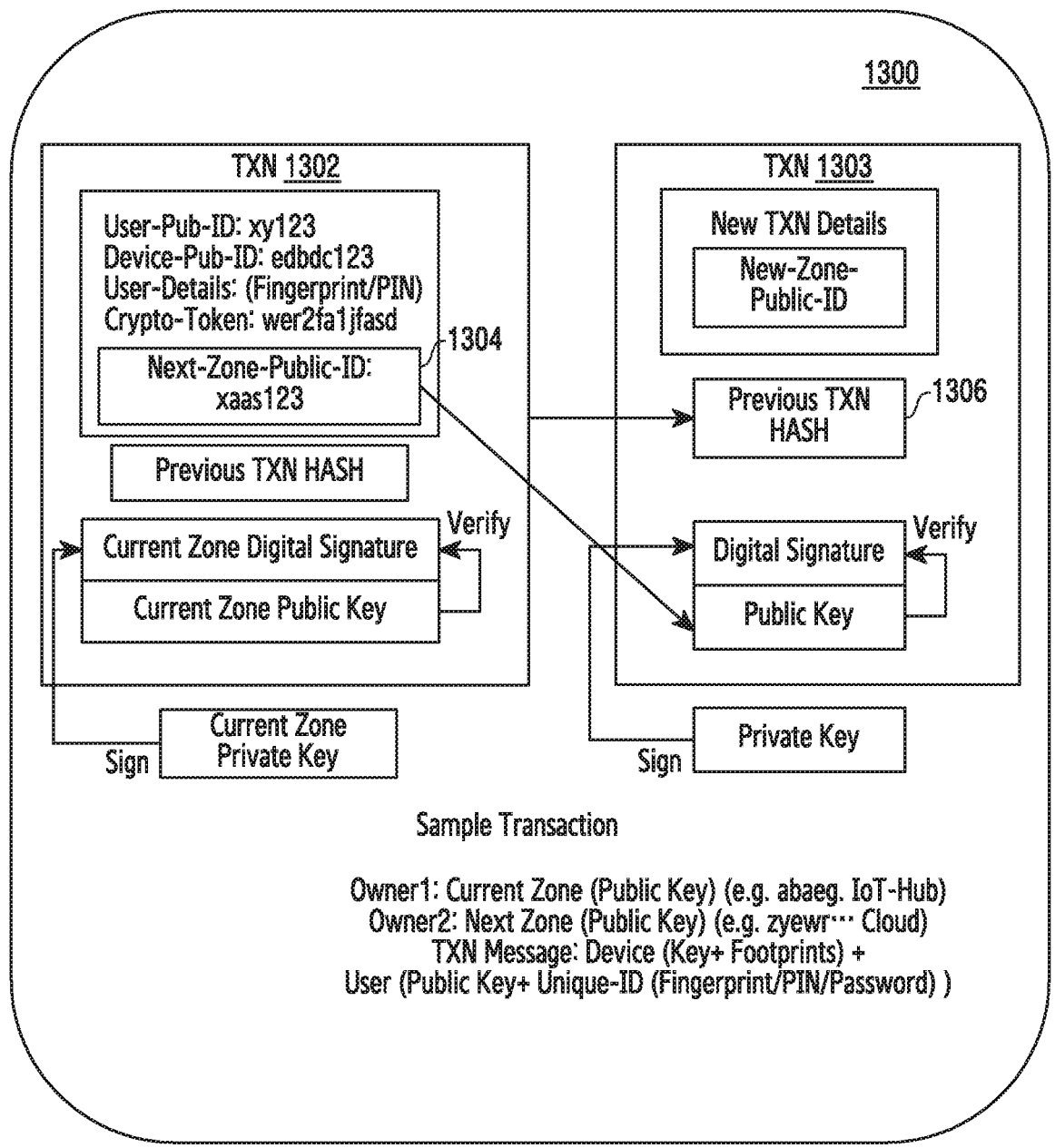
FIG. 13A illustrates a transaction between two nodes on an IoT network based on a blockchain, according to an embodiment of the disclosure.

FIG. 13A illustrates a sample transaction between a user device and a node 206F according to an embodiment of the disclosure.

Referring to FIG. 13A, a sample transaction 1300 between the user device 701 and the node 206F is illustrated. Referring back to FIGS. 2B and 7, the user device 701 generates a request for a transaction with the zone B and the node 206F. The type of device is determined based on the access request by the query controller 301. The IoT token is validated by the token validator 302, based on information available on the blockchain 202. As the user 250 transitions from the zone A to the zone B, an IoT token 1304 from a transaction 1302 is validated by the node 206F. Upon successful validation, the user device 701 can access the zone B. Further, the hash 1306 of the transaction 1303 is validated with to ascertain the previous transaction trail of the user device 701. In some embodiments, a private authentication involving validation of a private key such as a password or biometric validation may also be done to enhance security.

The transaction predictor 303 determines the type of transaction being requested by the user device 701. Based on the determined transaction trails, the token generator 304 generates updated IoT tokens associated with the zones A, B and C or any other nodes potentially on the future transaction trails of the user device 701. The IoT token 1304 is updated with the generated IoT tokens. For example, the IoT tokens pertaining to the nodes 206G, 206H, 206I, 206J and 206K are generated and stored on the user device 701. Further, IoT tokens pertaining to a potential transition to the zone C are also generated and stored. The associated transaction and the updated IoT token is broadcast to the nodes in the IoT network 220. The consensus module 306 utilizes one of a crypto-token protocol, a light cryptographic consensus protocol and a variable cryptographic consensus protocol, consensus is achieved, thereby adding the transaction and the updated IoT token to the blockchain 202.

Figure 13B:
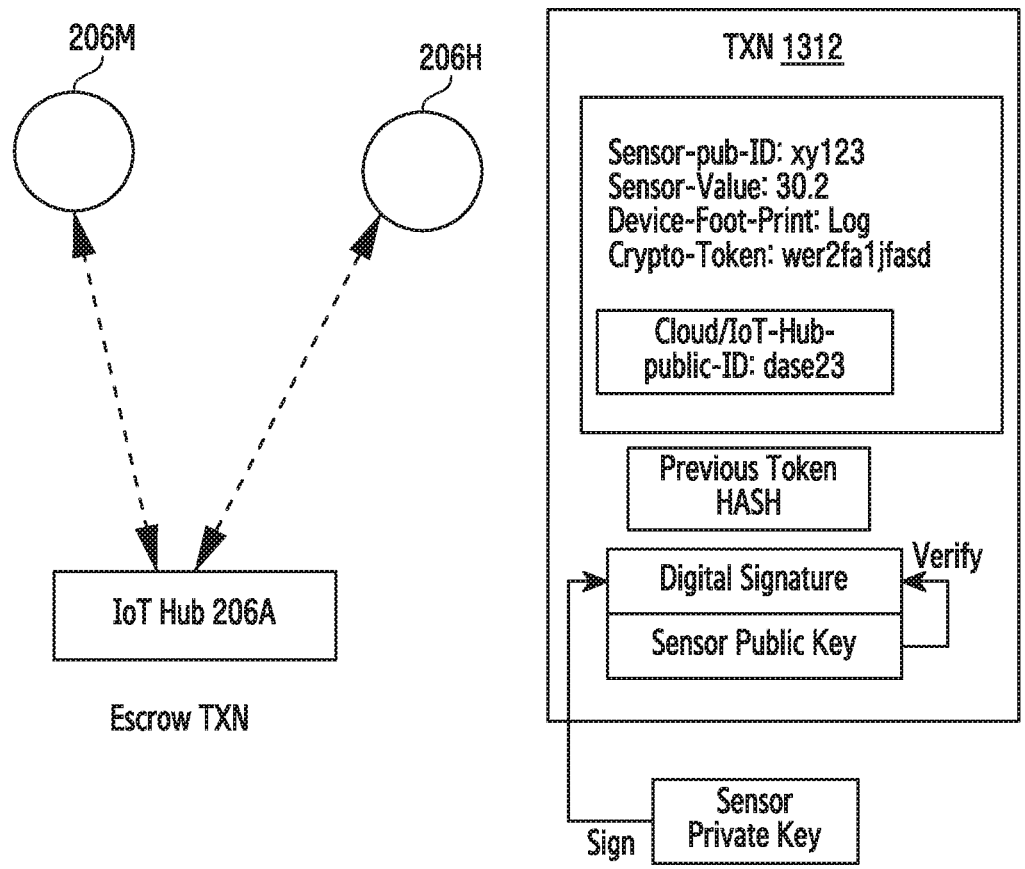
FIG. 13B illustrates an escrow transaction based on a blockchain, according to an embodiment of the disclosure.

FIG. 13B illustrates an escrow transaction in an IoT network according to an embodiment of the disclosure.

Referring to FIG. 13B, an escrow transaction is used for node to node communication in the IoT network 220. For example, the node 206H can be a smoke detector and the node 206M can be a water sprinkler. The node 206M is activated upon communication with the node 206H. To facilitate a secure communication between the node 206H and the node 206M, the node 206A is used as an escrow. Any of the nodes in the IoT network 220 may be used as an escrow. The node 206A validates transaction data 1312 transmitted by the node 206H. An IoT token pertaining to either the node 206A or the node 206M is validated by the node 206A to ensure that the communication is legitimate. The transaction data 1312 is broadcast to all the nodes in the IoT network 220, and upon consensus, the transaction is allowed.

Figure 14:
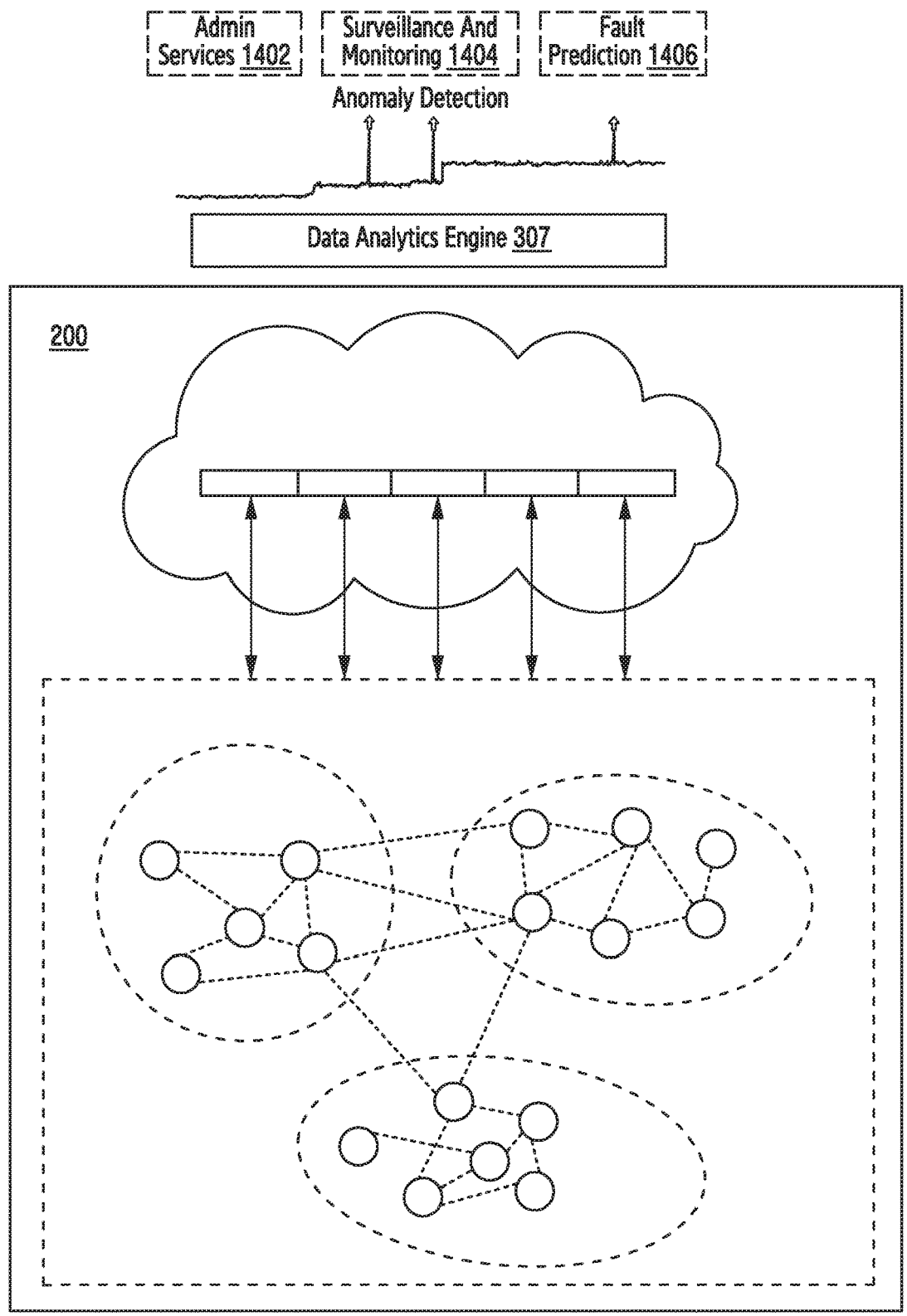
FIG. 14 illustrates a mechanism for analytics over Hyperledger™ according to an embodiment of the disclosure.

FIG. 14 illustrates a mechanism for analytics over Hyperledger™ according to an embodiment of the disclosure.

Referring to FIG. 14, the data analytics engine 307 determines various statistical data based on the transaction trails of the user device 701. The data analytics engine 307 develops models through machine learning through which faults in the IoT network 220 can be mitigated. The data analytics engine 307 is coupled to the distributed Hyperledger™ and its associated transaction pool to enhance fault tolerance, anomaly detection and to execute smart contracts. Analytics over the Hyperledger™ provide administrative services 1402, surveillance and monitoring services 1404 and fault prediction 1406.

Hyperledger™ is an open source blockchain framework to build solutions on top of it. It enables to build a transaction trail in the IoT network 220. This Hyperledger™ is implemented in various nodes of the IoT network 220 which has suitable computation power, thereby facilitating a distributed environment. The data analytics engine 307 is run on top of the Hyperledger™, i.e. it gathers information from the blockchain 202 and runs analytics. For example, the node 206A can have information about all the nodes in the zone A. Defective nodes are detected by running analytics on all the data.

Since, transactions take time to be added into the blockchain 202, some analytics are run to decide which transactions are of higher priority based on criticality. Therefore, the data analytics engine 307 uses the data from the blockchain and the Hyperledger™ framework and performs certain tasks such as but not limited to fault detection and priority based transaction addition in the blockchain 202.

Figure 15:
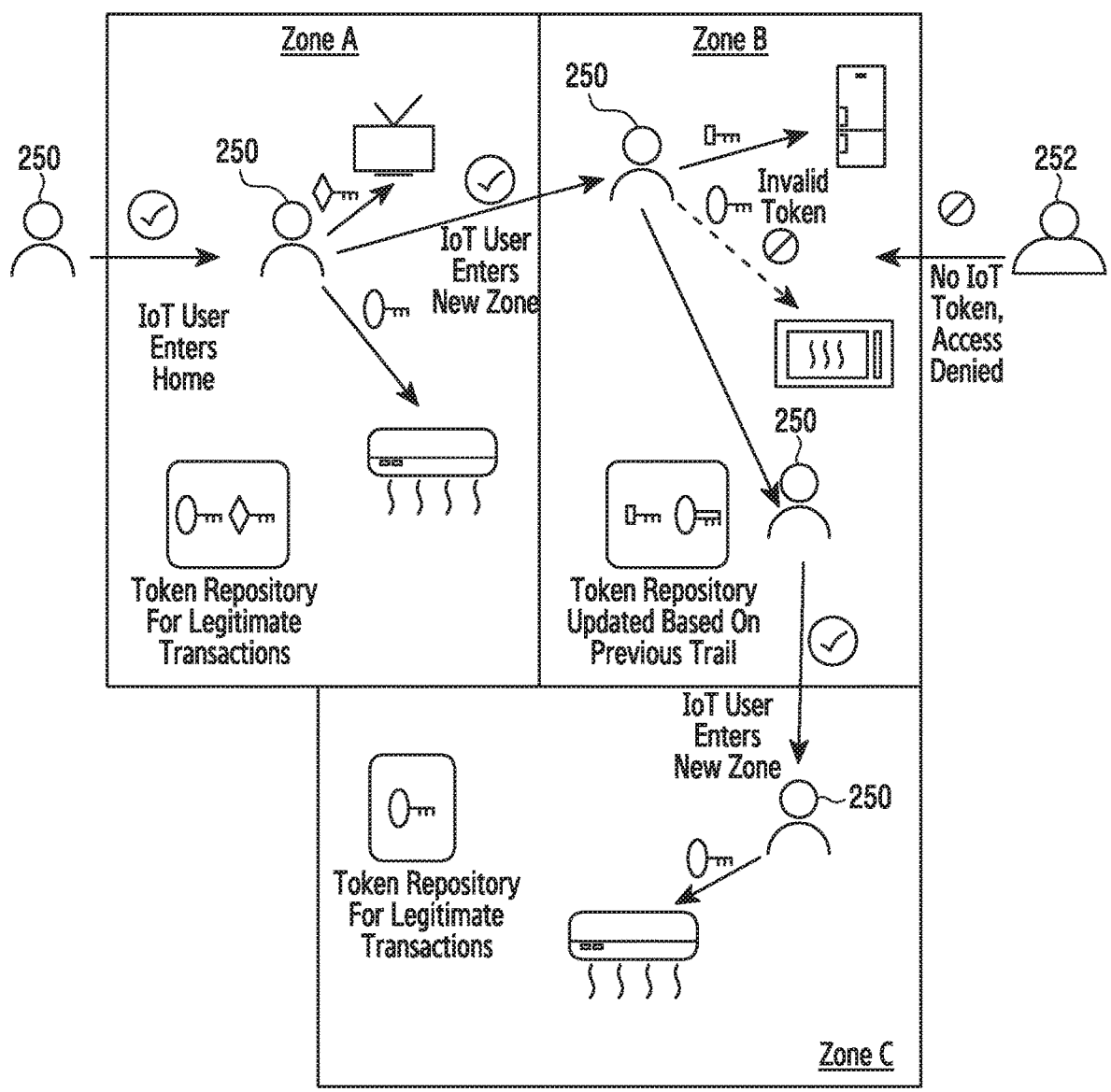
FIG. 15 illustrates an example scenario in which continuous security is implemented in a smart home using secure IoT tokens based on a blockchain, according to an embodiment of the disclosure.

FIG. 15 illustrates a smart home with an IoT network, based on a system (shown in FIGS. 2A and 2B) according to an embodiment of the disclosure.

Referring to FIG. 15, in a smart home 1500 the user 250 enters zone A of the smart home 1500 after the user device 701 is detected and one or more IoT tokens pertaining to the zone A are validated. Upon successful validation, the user device 701 is updated with IoT tokens pertaining the various devices on the IoT network of the smart home 1500 and with IoT tokens pertaining to zone B and zone C. If the user 250 enters zone B, all the IoT tokens and potential transactions pertaining to zone C are blocked. This is because, owing to the geography of the smart home, a transition from zone B to zone C includes a transition from zone B to zone A and a transition from zone A to zone C. As illustrated in FIG. 13A, when the user 250 moves to zone B, the IoT tokens are updated with tokens pertaining to the devices present in zone B and any possible transition to zone A.

The user 252 attempting to enter the smart home 1500 through zone B or zone C is disallowed since no IoT token pertaining to zone B are provided. The IoT tokens pertaining to zone B or zone C are only updated when the user 252 enters the smart home through zone A, which is the legitimate transaction trail or user trail.

Figure 16A:
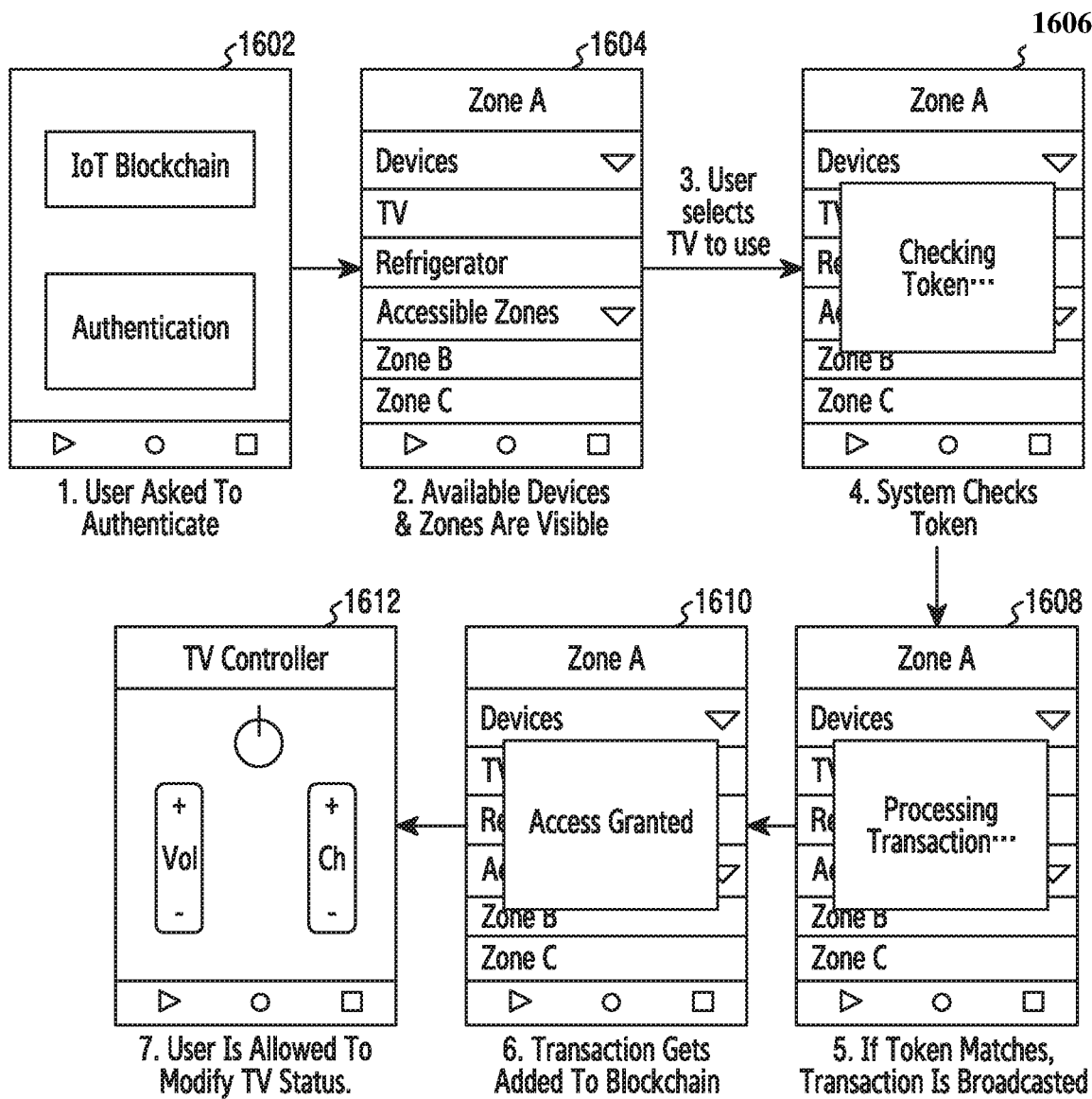
FIG. 16A illustrates a user interface using continuous security implemented in a smart home using secure IoT tokens based on a blockchain, according to an embodiment of the disclosure.
Figure 16B:
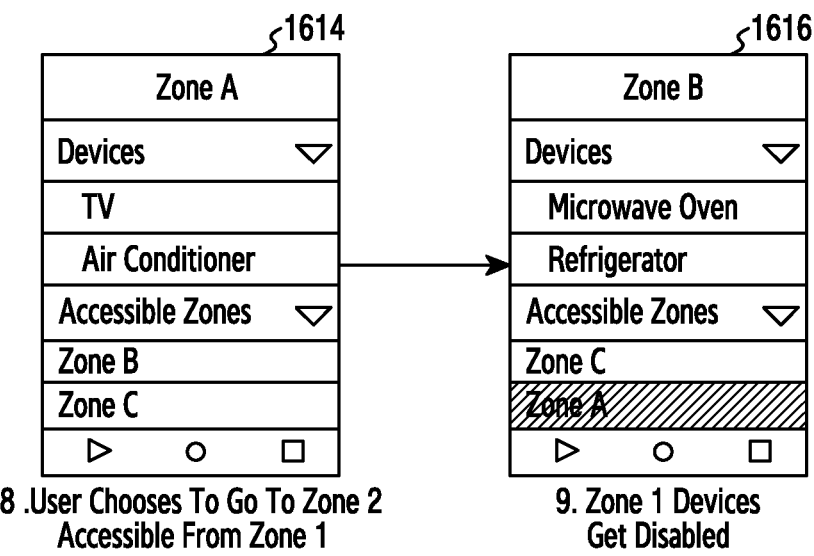
FIG. 16B illustrates a user interface of disabled devices during transitioning between zones of a smart home, according to an embodiment of the disclosure.

FIGS. 16A and 16B illustrate an interface displayed on a user device for controlling access in a smart home according to various embodiments of the disclosure.

Referring to FIG. 16A, a smart home 1500 includes devices that have the same hardware units as the node 206A shown in FIG. 3A. The user device 701 generates a request for a transaction over the IoT network 220. At operation 1602, a screen for private authentication is shown. The user 250 is authenticated through a valid password or through biometric authentication to access the blockchain 202. At operation 1604, available devices in zone A are displayed on the user device 701. The displayed devices pertain to corresponding IoT tokens that are stored in the user device 701 after entering zone A. Upon selecting a device, the corresponding IoT token is validated, in operation 1606. The IoT token is validated by the token validator 302, based on information available on the blockchain 202. Upon successful validation, at operation 1608, the transaction is broadcast to the blockchain 202 and the various devices in the smart home 1500.

The transaction predictor 303 determines the type of transaction being requested by the user device 701. Based on the determined transaction trails, the token generator 304 generates updated IoT tokens associated with the zones A, B and C or any other nodes potentially on the future transaction trails of the user device 701. The access controller 310 dynamically updates the IoT tokens of the user device. The associated transaction and the updated IoT token is broadcast to the nodes in the IoT network 220. The consensus module 306 utilizes one of a crypto-token protocol, a light cryptographic consensus protocol and a variable cryptographic consensus protocol, consensus is achieved. Consequently, at operation 1610, the transaction and the updated IoT token is added to the blockchain 202. Accordingly, the updated IoT tokens are stored on the user device and the memory 330. Further the transaction predictor 303 updates a probability matrix based on the added transaction to determine future transaction trails of the user device 701. At operation 1610, the user 250 can access the chosen device. At operation 1612, the user 250 can modify the status of the device.

Referring to FIG. 16B, the interface 1600 showing devices in the zone A is rendered inaccessible to the user 250, when the user 250 transitions from zone A to zone B, at operation 1614. At operation 1616, when the user 250 is present in zone B, the devices in zone A are disabled. Thus, the user 250 is only allowed to access the devices in the zone the user 250 is present in or detected to be in.

Figure 17:
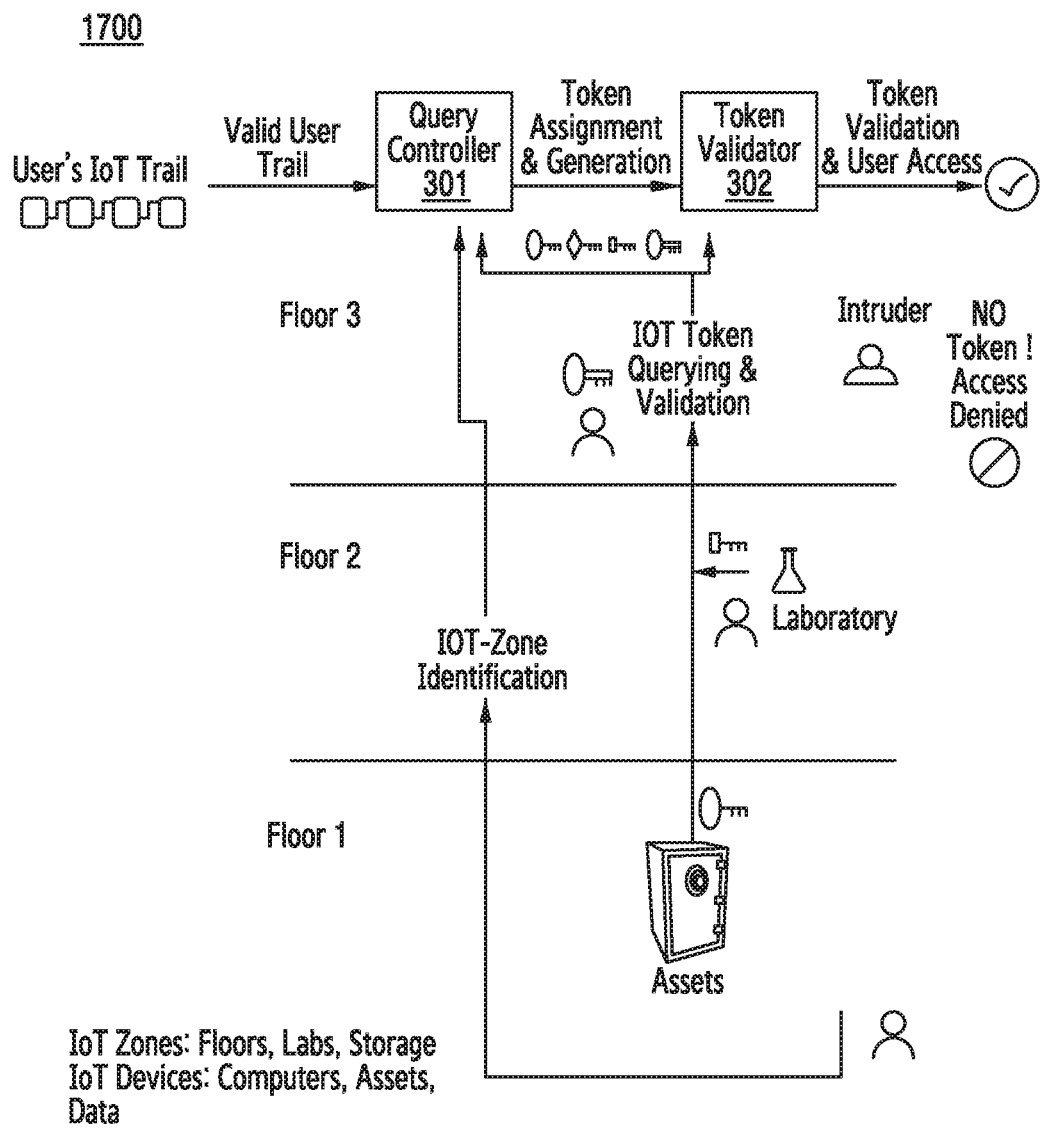
FIG. 17 illustrates an example scenario in which continuous security is implemented in a smart building using secure IoT tokens based on a blockchain, according to an embodiment of the disclosure.

FIG. 17 illustrates a smart building with an IoT network, based on the system (shown in FIGS. 2A and 2B) according to an embodiment of the disclosure.

Referring to FIG. 17, a user enters a first floor of a smart building 1700 after a user device with the user is detected and allowed after validation of one or more IoT tokens of the first floor. Upon successful validation, the user device is updated with IoT tokens pertaining the various device on the IoT network of the smart building 1700 and with IoT tokens of a second floor. Referring to FIG. 13A, when the user moves to the second floor, the IoT tokens are updated with tokens of the devices present in the second floor and any transition to the first floor or a third floor.

The user attempting to enter the smart building 1700 through the second floor or the third floor is disallowed since no IoT token pertaining to the second floor are provided. The IoT tokens pertaining to the second floor or the third floor are only updated when the user enters the smart building through the first floor, which is the legitimate transaction trail or user trail.

In some embodiments, access to a floor is blocked based on the identification of the user. The user may be authorized to access the second floor only. In such a case, only IoT tokens pertaining to the second floor are updated on the user device.

Figure 18:
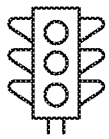
FIG. 18 illustrates an example scenario in which dynamic traffic control is implemented using secure IoT tokens based on a blockchain, according to embodiments of the disclosure.
Figure 18:
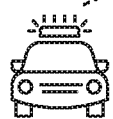
Figure 18:
Figure 18:
Figure 18:

FIG. 18 illustrates a method for dynamic traffic control in a city with an IoT network according to an embodiment of the disclosure.

Referring to FIG. 18, a method 1800 in an IoT network is based on the system 200 (shown in FIGS. 2A and 2B). Emergency service personnel such as ambulance driver or police officers may be provided with IoT devices that are linked to a blockchain and the IoT network. The IoT devices are provided with IoT tokens. Traffic signals on the IoT network are controlled by the detection of these devices and validation of the IoT tokens. IoT tokens are further generated based on a valid trail. For example, an ambulance driver activates the IoT device when on an emergency commute to a hospital. Accordingly, potential routes to the hospital are determined. IoT tokens pertaining to an upcoming traffic signal on a determined route are generated and stored on the IoT device. The traffic signals are dynamically controlled based on the presence of the IoT device proximal to the traffic signals. Upon successful validation, the IoT token for the next upcoming traffic signal is generated and stored on the IoT device. Accordingly, based on the route taken by the ambulance driver, other traffic signals in the city are adjusted to control the traffic.

Figure 19:
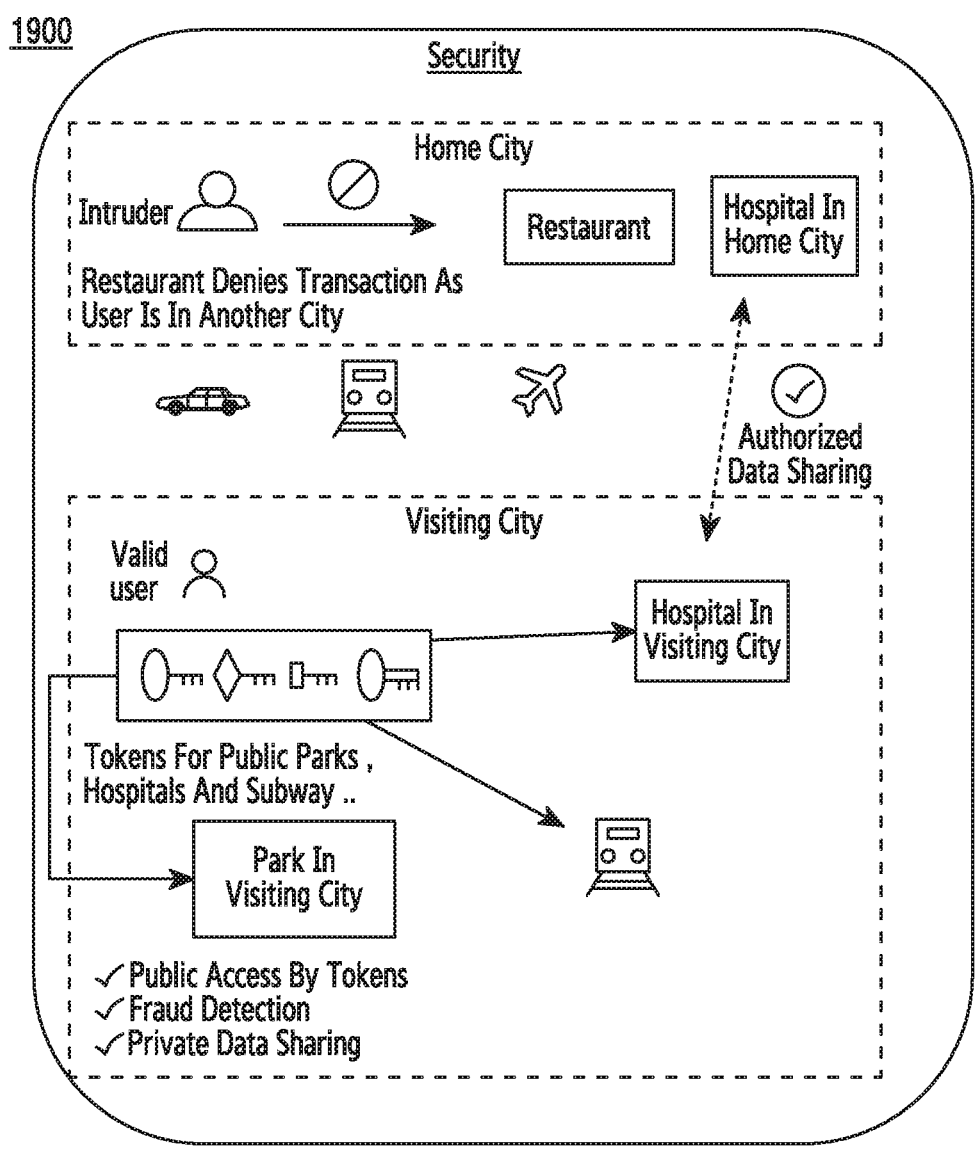
FIG. 19 illustrates an example scenario in which continuous surveillance and monitoring is provided using secure IOT token based on a blockchain, according to embodiments of the disclosure.

FIG. 19 illustrates a method for accessing services in a city with an IoT network according to an embodiment of the disclosure.

Referring to FIG. 19, a method 1900 in IoT network is based on the system 200 (shown in FIGS. 2A and 2B). Transactions in restaurants, hospitals or any other public service are activated based on a valid identification of the user. A local resident is provided with an IoT device with IoT tokens pertaining to local services. When the local resident travels to another city, the IoT device is provided with IoT tokens pertaining to entering the other city, when the local resident initiates a transaction for travel charges. For example, when the local resident purchases a ticket for air travel or train travel, the IoT device is provided with IoT tokens pertaining to entering the other city. Upon entering the other city, the IoT device is further updated with IoT tokens pertaining to local services available. In another example, if the local resident needs healthcare services in the other city, based on a successful validation of IoT tokens present on the IoT device, healthcare data is automatically shared between a hospital in the city and the hospital the local resident visits in the other city.

Figure 20:
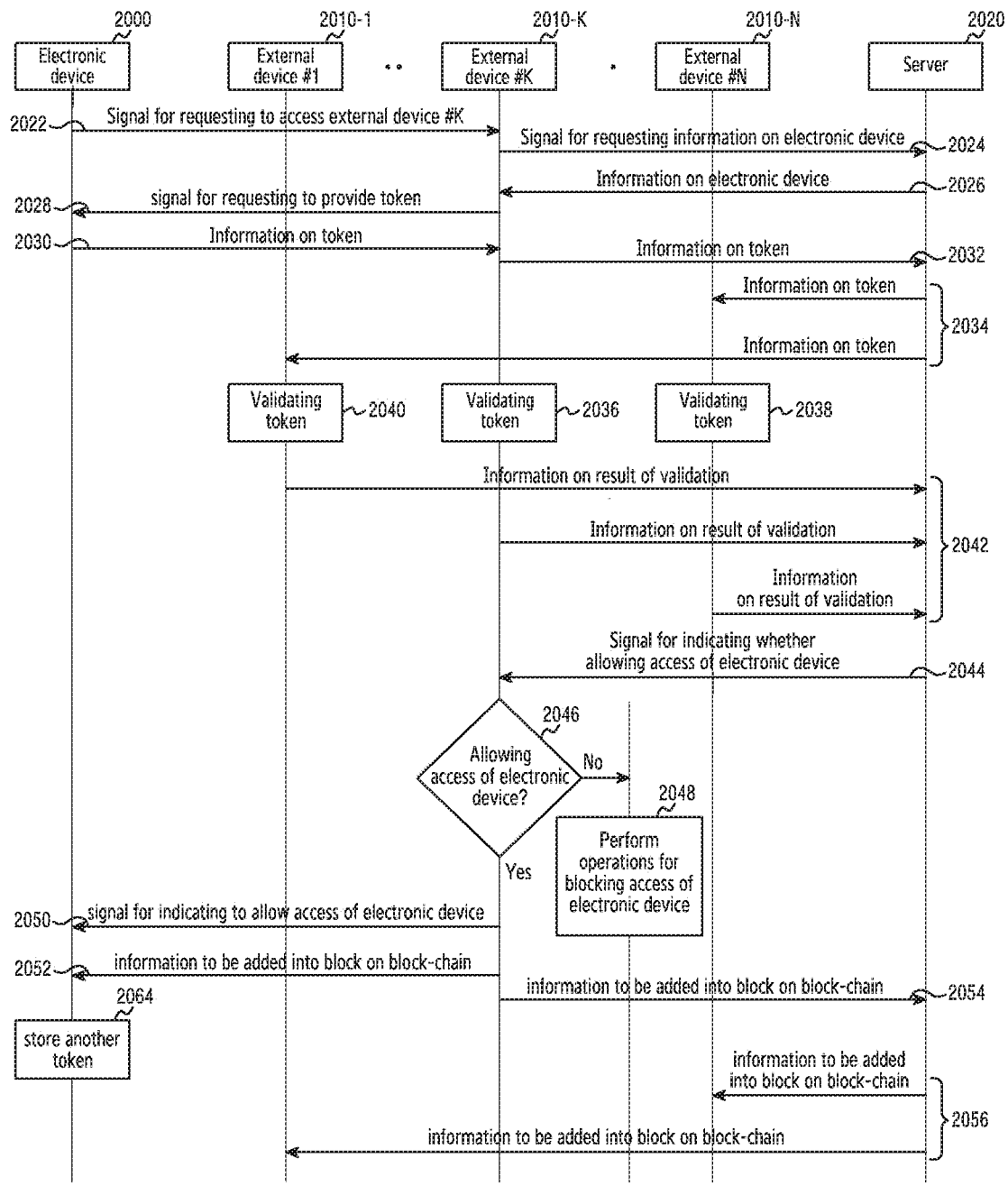
FIG. 20 illustrates a signaling in a system including an electronic device, a plurality of external devices, and a server according to an embodiment of the disclosure.

FIG. 20 illustrates a signaling in a system including an electronic device, a plurality of external devices, and a server according to various embodiments of the disclosure.

Referring to FIG. 20, the system may include an electronic device 2000, a plurality of external devices 2010-1 to 2010-N, and a server 2020.

The electronic device 2000 comprises an electronic device that carried by a user who enters into the system or that is worn by the user. For example, the electronic device 2000 comprises a smart phone, a game console, an electronic dictionary, an electronic key, a camcorder, or a wearable device (e.g., a smart watch, a head mounted display, and so on).

In operation 2022, the electronic device 2000 may transmit a signal for requesting to access the external device 2010-K. For example, the electronic device 2000 may transmit the signal for requesting to access the external device 2010-K to enter into the system. In various embodiments, the signal for requesting to access the external device 2010-K may further include information on an identifier (ID) of the electronic device 2000. In various embodiments, the signal for requesting to access the external device 2010-K may further include information on authority of access of the electronic device 2000. The external device 2010-K may receive the signal for requesting to access the external device 2010-K from the electronic device 2000.

In operation 2024, the external device 2010-K may transmit a signal for requesting information on the electronic device 2000 to the server 2020. In various embodiments, the external device 2010-K may transmit the signal for requesting the information on the electronic device 2000 to the server 2020 to identify the presence of the electronic device 2000. In various embodiments, the external device 2010-K may transmit the signal for requesting the information on the electronic device 2000 to identify, among a plurality of tokens that are stored in the external device 2010-K for a security, a token specified for the electronic device 2000. In various embodiments, the external device 2010-K may transmit the signal for requesting the information on the electronic device 2000 for a procedure of a validation to be performed for allowing access of the electronic device 2000. In various embodiments, the external device 2010-K may transmit the signal for requesting the information on the electronic device 2000 to notify that the electronic device 2000 accesses the external device 2010-K to remaining external devices (e.g., the external device 2010-1, the external device 2010-N, and the server 2020, and so on). The server 2020 may receive the signal for requesting the information on the electronic device 2000. In response to receiving the signal for requesting the information on the electronic device 2000, the server 2020 may obtain or generate the information on the electronic device 2000. In various embodiments, the information on the electronic device 2000 obtained by the server 2020 may include information for identifying the token specified for the electronic device 2000 among the plurality of tokens in the external device 2010-K. In various embodiments, the information on the electronic device 2000 obtained by the server 2020 may include information regarding at least one external device expected to be accessed by the electronic device 2000. In various embodiments, the at least one external device may be identified, among the plurality of external devices 2010-1 to 2010-N, based at least in part on the authority of the electronic device 2000 associated with the system. In various embodiments, the at least one external device may be identified, among the plurality of external devices 2010-1 to 2010-N, based at least in part on a geographical location relationship between the external device 2010-K and each of remaining external devices.

In operation 2026, the server 2020 may transmit the information on the electronic device 2000 to the external device 2010-K. In various embodiments, the server 2020 may transmit, in response to obtaining the information on the electronic device 2000, the information on the electronic device 2000 to the external device 2010-K. The external device 2010-K may receive the information on the electronic device 2000 from the server 2020.

In operation 2028, the external device 2010-K may transmit a signal for requesting to provide a token to the electronic device 2000. In various embodiments, the external device 2010-K may transmit, in response to receiving the information the electronic device 2000, the signal for requesting to provide the token to the electronic device 2000. In various embodiments, the token is used for validating the electronic device 2000. The electronic device may receive the signal for requesting to provide the token to the electronic device 2000.

In operation 2030, the electronic device 2000 may transmit information on the token that is requested. In various embodiments, the token is generated based on at least part of a block chain that includes a plurality of blocks. Each of the plurality of blocks is associated with a history for at least one access previous to the current access to the external device 2010-K. In various embodiments, each of the plurality of blocks is specified for the electronic device 2000. In various embodiments, each of the plurality of blocks is validated by all of the plurality of external devices 2010-1 to 2010-N. The external device 2010-K may receive the information on the token from the electronic device 2000.

In operation 2032, the external device 2010-K may transmit the information on the token to the server 2020. In various embodiments, the external device 2010-K may transmit the information on the token to the server 2020 for validation of all of the remaining external devices. The server 2020 may receive the information on the token from the external device 2010-K.

In operation 2034, the server 2020 may transmit, to remaining external devices, the information on the token. In various embodiments, the server 2020 may transmit, to the remaining external devices, the information on the token to validate the token in the remaining external devices. The remaining external devices may receive the information on the token from the server 2020.

In operation 2036, the external device 2010-K may validate the token. In various embodiments, the external device 2010-K may validate the token by comparing the token that is provided by the electronic device 2000 with a token that is stored in the external device 2010-K. For the comparison, the external device 2010-K may divide the token into the plurality of blocks. In various embodiments, the operation 2036 and the operation 2032 are performed simultaneously or in a reverse order.

In operations 2038 and 2040, each of the remaining external devices may validate the token. The operations 2038 and 2040 corresponds to the operation 2036.

In operation 2042, the plurality of external devices 2010-1 to 2010-N may transmit information on the result of the validation to the server 2020 respectively. The server 2020 may receive the information on the result of the validation to the server 2020 respectively. In various embodiments, the server 2020 may obtain or generate a signal for indicating whether allowing the access of the electronic device 2000 to the external device 2010-K. In various embodiments, the server 2020 may identify, based at least in part on the results of the validations that are performed by the plurality of external devices 2010-1 to 2010-N, whether the access of the electronic device 2000 is legitimate or not. The server 2020 may obtain, based at least in part on the identification, the signal for indicating whether allowing the access of the electronic device 2000 to the external device 2010-K. For example, if identifying that all of the validations performed by the plurality of external devices 2010-1 to 2010-N success, the server 2020 may obtain a signal for indicating to allow the access of the electronic device 2000 to the external device 2010-K. For another example, if identifying that at least a portion of the validations performed by the plurality of external devices 2010-1 to 2010-N fails, the server 2020 may obtain a signal for indicating not to allow the access of the electronic device 2000 to the external device 2010-K.

In operation 2044, the server 2020 may transmit the signal for indicating whether allowing the access of the electronic device 2000 to the external device 2010-K. The external device 2010-K may receive the signal for indicating whether allowing the access of the electronic device 2000 to the external device 2010-K from the server 2020.

In operation 2046, the external device 2010-K may identify whether to allow the access of the electronic device 2000 according to the received signal. For example, the external device 2010-K may identify that allowing the access of the electronic device 2000 based at least in part on receiving the signal for indicating to allow the access of the electronic device 2000 to the external device 2010-K. For another example, the external device 2010-K may identify that not allowing the access of the electronic device 2000 based at least in part on receiving the signal for indicating not to allow the access of the electronic device 2000 to the external device 2010-K.

In operation 2048, the external device 2010-K may perform, in response to identifying not to allow the access of the electronic device 2000, operations for blocking the access of the electronic device 2000. For example, the external device 2010-K may transmit an alert message (or warning message) that indicates to block the access of the electronic device 2000 to the electronic device 2000.

In operation 2050, the external device 2010-K may transmit, in response to identifying to allow the access of the electronic device 2000, a signal for indicating to allow the access of the electronic device 2000 to the electronic device 2000. The electronic device 2000 may receive the signal for indicating to allow the access of the electronic device 2000 from the external device 2010-K.

In operation 2052, the external device 2010-K may transmit information to be added into a block on the block chain for another token to be generated by the electronic device 2000. In various embodiments, the other token is distinct from the token that has been provided by the electronic device 2000 to the electronic device 2000. In various embodiments, the information may correspond to the at least one external device expected as to be accessed by the electronic device 2000 among the plurality of external devices 2010-1 to 2010-N.

In operation 2054, the external device 2010-K may transmit the information to be added into the block on the block chain for the other token to be generated to the server 2020. In various embodiments, the external device 2010-K may transmit the information to be added into the block on the block chain for the other token to the server 2020 to notify that the other token will be generated. The server 2020 may receive the information from the external device 2010-K.

In operation 2056, the server 2020 may broadcast the information to be added into the block on the block chain for the other token. The remaining external devices may receive the information from the server 2020.

In operation 2064, the electronic device 2000 may store the other token that is generated based on at least part of the information to be added into the block on the block chain.

Figure 21:
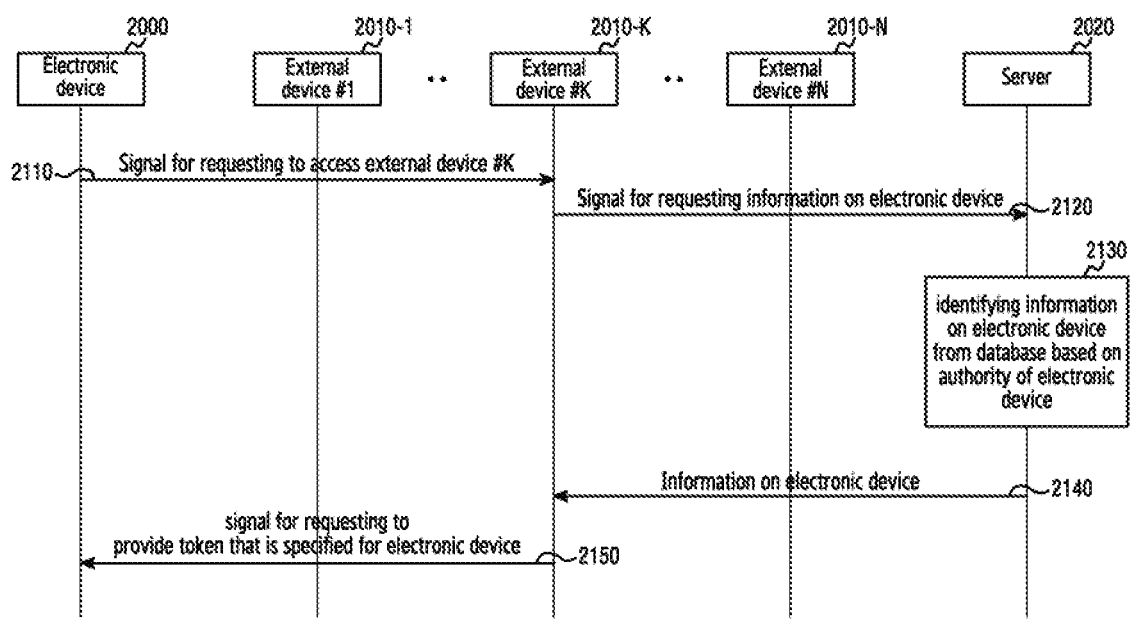
FIG. 21 illustrates a signaling in a system including an electronic device, a plurality of external devices, and a server according to an embodiment of the disclosure.

FIG. 21 illustrates a signaling in a system including an electronic device, a plurality of external devices, and a server according to an embodiment of the disclosure.

Operations 2110 to 2150 of FIG. 21 may be associated with operations 2022 to 2026 of FIG. 20.

Referring to FIG. 21, in operation 2110, the electronic device 2000 may transmit the signal for requesting to access the external device 2010-K. The external device 2010-K may receive the signal for requesting to access the external device 2010-K from the electronic device 2000.

In operation 2120, the external device 2010-K may transmit the signal for requesting the information on the electronic device 2000 to the server 2020. The server 2020 may receive the signal for requesting the information on the electronic device 2000.

In operation 2130, the server 2020 may identify the information on the electronic device 2000 from a database based on the authority of the electronic device 2000. In various embodiments, the database may include information on an authority of each of a plurality of electronic devices accessible to the system. In various embodiments, the database may include information on a token corresponding to the authority of each of the plurality of electronic devices accessible to the system. In various embodiments, the database may include information on an expected access path of each of the plurality of electronic devices accessible to the system. In other words, the database is configured with the user-specific or the device-specific information. In various embodiments, the information on the authority may associate with the information on the token. In various embodiments, the information on the authority may associate with the information on the expected access path. In various embodiments, the information on the token may associate the information on the expected access path. In various embodiments, the server 2020 may retrieve the information on the electronic device 2000 from the database, based at least in part on the authority of the electronic device 2000.

In operation 2140, the server 2020 may transmit the information on the electronic device 2000 to the external device 2010-K.

In operation 2150, the external device 2010-K may transmit a signal for requesting to provide the token that is specified for the electronic device 2000. In various embodiments, the token is specified for the electronic device 2000 based on the authority of the electronic device 2000.

The embodiments disclosed herein can be implemented through at least one software program running on at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalent.

What is claimed is:

1. An electronic device in a system including a plurality of external devices, the electronic device comprising:
   a memory configured to store instructions;
   a communication circuitry; and
   a processor operably coupled to the communication circuitry, the processor configured to execute the stored instructions to:
      transmit, to an external device, a first signal for accessing the external device,
      receive, from the external device, a second signal for requesting to provide a token,
      in response to the reception, transmit, to the external device, information on the token, wherein the information on the token comprises information regarding at least in part a block chain associated with at least one external device that has been accessed by the electronic device among the plurality of external devices,
      receive, from the external device, a third signal for indicating the access of the electronic device, wherein the received third signal is transmitted from the external device in response to identifying, by the external device, a validation of the token in all of the plurality of external devices, and
      access the external device based at least in part on the third signal for indicating an allowance of the access of the electronic device.

2. The electronic device of claim 1, wherein the processor is further configured to execute the stored instructions to:
   receive, from the external device, a fourth signal that comprises information to be added into at least another block corresponding to at least one external device expected as to be accessed by the electronic device, wherein the fourth signal is transmitted from the external device in response to identifying, by the external device, the validation of the token, and
   obtain another token based at least in part on the information that is added into the at least another block.

3. The electronic device of claim 2, wherein the processor is further configured to execute the stored instructions to:
   add the at least another block into at least one block, and
   in response to the addition, obtain the other token based at least in part on the block chain that includes the at least one block and the at least another block.

4. The electronic device of claim 3, wherein the at least one block and the at least another block are concatenated to each other.

5. The electronic device of claim 2,
   wherein the processor is further configured to execute the stored instructions to:
      after obtaining the other token, transmit, to another external device, the other token by using the communication circuitry to access the other external device, and
   wherein the at least another block is located subsequent to the at least one block.

6. The electronic device of claim 2,
   wherein the information on the token is provided from the external device through a server included in the system to other external devices,
   wherein validating the token is performed by the other external devices based on the information on the token that is provided from the external device through the server included in the system to the other external devices, and
   wherein the validating of the token in the external device is performed based on the information on the token transmitted from the electronic device.

7. The electronic device of claim 6, wherein the at least one external device is identified by the server based at least in part on an authority of the electronic device or a geographical location relation between each of the other external devices.

8. An electronic device in a system including a plurality of external devices, the electronic device comprising:
   a memory configured to store instructions;
   a display;
   a communication circuitry; and
   a processor operably coupled to the communication circuitry, the processor configured to execute the stored instructions to:
      display a first user interface including at least one object corresponding to at least one external device, in response to detecting an input on an object, transmit, to an external device, a first signal for requesting to access the external device corresponding to the object, receive, from the external device, a second signal for requesting to provide a token, in response to the reception, transmit, to the external device, information on the token, wherein the information on the token comprises information regarding at least in part a block chain associated with at least one external device that has been accessed by the electronic device among the plurality of external devices, receive, from the external device, a third signal for indicating the access of the electronic device, wherein the received third signal is transmitted from the external device in response to identifying, by the external device, a validation of the token in all of the plurality of external devices, and in response to receiving the third signal, display, in the first user interface, a message for indicating an allowance of the access of the electronic device.

9. The electronic device of claim 8, wherein the block chain includes at least one block that is associated with the at least one external device that has been accessed by the electronic device.

10. The electronic device of claim 8, wherein the message is superimposed on the at least one object.

11. The electronic device of claim 8, wherein the processor is further configured to execute the stored instructions to:
access, in response to receiving the third signal, the external device based at least in part on the third signal.

12. The electronic device of claim 11,
wherein the processor is further configured to execute the stored instructions to:
receive, from the external device, a fourth signal that comprises information to be added into at least another block corresponding to at least one external device expected as to be accessed by the electronic device, wherein the fourth signal is transmitted from the external device in response to identifying, by the external device, the validation of the token, and
obtain another token generated based at least in part on the information that is added into the at least another block, and
wherein the at least one block and the at least another block are concatenated to each other.

13. The electronic device of claim 12, wherein the processor is further configured to execute the stored instructions to:
based on obtaining the other token, activate at least one object corresponding to the at least one external device within the first user interface to indicate that an access to each of the at least one external device is allowable.

14. The electronic device of claim 13, wherein the processor is further configured to execute the stored instructions to:
detect another input on another object among the activated at least one object, and
based at least in part on detecting the other input, transmit, to another external device corresponding to the other object, the other token to access the other external device.

15. A non-transitory computer readable storage medium having a computer readable program stored therein, the computer readable program, when executed by at least one processor in a server, configures the at least one processor to:
receive, from an external device included in a system associated with the server, information on a token that is provided from an electronic device to the external device;
transmit, to other external devices, the information on the token, wherein the information on the token comprises information regarding at least in part a block chain associated with at least one external device that has been accessed by the electronic device among a plurality of external devices;
receive, from the plurality of external devices, information on results validating the token; and
transmit, to the external device, a signal for indicating an allowance of an access of the electronic device.

16. The non-transitory computer readable storage medium of claim 15, wherein the computer readable program, when executed by the at least one processor, further configures the at least one processor to:
receive, from the external device, a signal for requesting information on the electronic device; and
transmit, to the external device, the information on the electronic device that is used for requesting the token to the electronic device.

17. The non-transitory computer readable storage medium of claim 15,
wherein the computer readable program, when executed by the at least one processor, further configures the at least one processor to:
transmit, to the external device, information on at least one block to be added into the token, and
wherein the at least one block corresponds to at least one external device expected to be accessed by the electronic device among the plurality of external devices.

18. The non-transitory computer readable storage medium of claim 17, wherein the at least one block is added into the token by all of the electronic device and the plurality of external devices.

* * * * *